United States Patent
Cazzanti et al.

(10) Patent No.: US 10,353,764 B1
(45) Date of Patent: Jul. 16, 2019

(54) AUTOMATED IDENTIFICATION OF DEVICE STATUS AND RESULTING DYNAMIC MODIFICATION OF DEVICE OPERATIONS

(71) Applicant: Amplero, Inc., Seattle, WA (US)

(72) Inventors: Luca Cazzanti, Seattle, WA (US);
Oliver B. Downs, Redmond, WA (US);
Matthew G. Danielson, Seattle, WA (US)

(73) Assignee: Amplero, Inc., Seattle, WA (US)

( * ) Notice: Subject to any disclaimer, the term of this patent is extended or adjusted under 35 U.S.C. 154(b) by 0 days.

(21) Appl. No.: 16/184,900

(22) Filed: Nov. 8, 2018

(51) Int. Cl.
G06F 11/00 (2006.01)
G06F 11/07 (2006.01)
G06N 7/00 (2006.01)

(52) U.S. Cl.
CPC ........ *G06F 11/079* (2013.01); *G06F 11/0721* (2013.01); *G06N 7/005* (2013.01)

(58) Field of Classification Search
CPC .... G06F 11/0721; G06F 11/079; G06N 7/005
See application file for complete search history.

(56) References Cited

U.S. PATENT DOCUMENTS

| | | | | |
|---|---|---|---|---|
| 6,012,152 A | * | 1/2000 | Douik | G06F 11/0709 714/26 |
| 7,536,595 B1 | * | 5/2009 | Hiltunen | G06F 11/0709 714/26 |
| 7,813,951 B2 | | 10/2010 | Eskandari | |
| 7,813,952 B2 | | 10/2010 | Eskandari | |

(Continued)

FOREIGN PATENT DOCUMENTS

| | | |
|---|---|---|
| WO | 2011/000770 A1 | 1/2011 |
| WO | 2014/127051 A1 | 8/2014 |

OTHER PUBLICATIONS

Cister, A. M., et al., "Telco churn analysis classification using a wavelet and RBF approach," Data Mining VII: Data, Text and Web Mining and their Business Application, WIT Transactions on Information and Communication Technologies, vol. 37, 2006, 10 pages.

(Continued)

*Primary Examiner* — Joshua P Lottich
(74) *Attorney, Agent, or Firm* — VLP Law Group LLP; James A. D. White

(57) ABSTRACT

Techniques are described for automatically and dynamically modifying ongoing operations of computing devices in device-specific manners, such as based on an automated identification of a computing device's status (e.g., identifying a likely ongoing or imminent failure of a smart phone or other computing device based on a series of observed hardware states of the computing device, and taking automated corrective actions to prevent or otherwise mitigate such device failure, such as by modifying configuration settings on the computing device or on associated systems). The techniques may include, for each of multiple device status outcomes of interest (e.g., device failure versus device non-failure), generating a state-space outcome model representing devices that reach that status outcome within a time period of interest, and using such outcome models to identify a likely ongoing or imminent outcome of a current device, with corresponding automated corrective actions then taken.

30 Claims, 9 Drawing Sheets

(56) References Cited

U.S. PATENT DOCUMENTS

| | | |
|---|---|---|
| 8,644,468 B2 | 2/2014 | Dantressangle et al. |
| 8,790,168 B1 | 7/2014 | Wolters et al. |
| 8,843,431 B2 | 9/2014 | Anderson et al. |
| 2005/0234763 A1 | 10/2005 | Pinto et al. |
| 2007/0156673 A1 | 7/2007 | Maga et al. |
| 2007/0185867 A1 | 8/2007 | Maga et al. |
| 2011/0218955 A1 | 9/2011 | Tang et al. |
| 2011/0295649 A1 | 12/2011 | Fine et al. |
| 2012/0053990 A1 | 3/2012 | Pereg et al. |
| 2012/0078814 A1 | 3/2012 | Clark et al. |
| 2013/0124258 A1 | 5/2013 | Jamal et al. |
| 2013/0124448 A1 | 5/2013 | Soulie-Fogelman |
| 2013/0204682 A1 | 8/2013 | Stachiw |
| 2014/0278779 A1 | 9/2014 | Maga et al. |
| 2015/0269609 A1 | 9/2015 | Mehanian et al. |
| 2015/0371163 A1 | 12/2015 | Noh et al. |
| 2016/0306689 A1* | 10/2016 | Jain .................... G06F 11/0742 |
| 2018/0005132 A1* | 1/2018 | Singh .................... G06N 7/005 |
| 2019/0043068 A1* | 2/2019 | Livne .................... G06N 20/00 |

OTHER PUBLICATIONS

Hernandez, J., "Client value on the presence of credit risk: A dynamic method to coordinate customer life time value and credit risk management decisions," University of Groningen, Research Master Thesis, Aug. 16, 2013, 42 pages.

\* cited by examiner

FIG. 2A

Status of Computing Device XXX
at Time: T-4, T-3, T-2, T-1

205: packet loss, device restart, application load time, application crashes, connection speed, dropped calls, screen capacitance, accelerometer data, ...

210: cracked screen, data port failure, antenna failure, ...

212: device failure, no failure

At T-4: no failure (circled)
At T-3: packet loss, antenna failure, no failure (circled)
At T-2: dropped calls, antenna failure, no failure (circled)
At T-1: device restart, antenna failure, device failure (circled)

Transition Matrix　　　　　　　　　　　　　　230

| | cracked screen | data port failure | antenna failure | ... |
|---|---|---|---|---|
| cracked screen | 0.95 | 0.2 | 0.3 | |
| data port failure | 0.05 | 0.85 | 0.1 | |
| antenna failure | 0.02 | 0.08 | 0.9 | |
| ⋮ | | | | |

Emission Matrix　　　　　　　　　　　　　　220

| | packet loss | device restart | ... | connection speed | dropped calls | ... |
|---|---|---|---|---|---|---|
| cracked screen | 0.0 | 0.05 | | 0.0 | 0.0 | |
| data port failure | 0.9 | 0.01 | | 0.09 | 0.0 | |
| antenna failure | 0.1 | 0.05 | | 0.35 | 0.5 | |
| ⋮ | | | | | | |

Initial State　　225

| | |
|---|---|
| cracked screen | 0.05 |
| data port failure | 0.02 |
| antenna failure | 0.01 |
| ⋮ | |

AUTOMATED IDENTIFICATION OF DEVICE STATUS AND RESULTING DYNAMIC MODIFICATION OF DEVICE OPERATIONS

TECHNICAL FIELD

The following disclosure relates generally to automatically identifying status of computing devices and dynamically modifying their ongoing operations in resulting manners, such as to dynamically mitigate a computing device failure that is predicted from a series of hardware states of the computing device.

BACKGROUND

Operations of computing devices are increasingly complex, with a variety of hardware components that may fail or suffer reduced performance under different conditions and at varying frequencies, and a variety of configuration settings that affect device operations. For example, it is common to have problems with battery life, screen displays (e.g., cracks, inoperable pixels, etc.), intermittent data or power connection interruptions, etc. In addition, smartphones and other mobile computing devices often have settings that affect device operations (e.g., battery usage, such as in an inverse proportion to other activities that affect device performance), and activities of related service providers (e.g., providers of telecom services or other network communication service) can also affect such device operations (e.g., with respect to how network communications to and from such devices are managed). Furthermore, applications executing on a computing device can affect various aspects of device reliability and other operations.

While attempts to manage device operations may increase effectiveness of the devices in some situations if they are performed correctly, problems exist with existing techniques for such device operation management, including in maximizing device life and otherwise mitigating device failures and other problems.

BRIEF DESCRIPTION OF THE DRAWINGS

FIGS. 2A-2F are diagrams illustrating examples of generating and using state-space outcome model data structures for automatically identifying current status of computing devices and dynamically modifying their ongoing operations.

DETAILED DESCRIPTION

Figure 1:
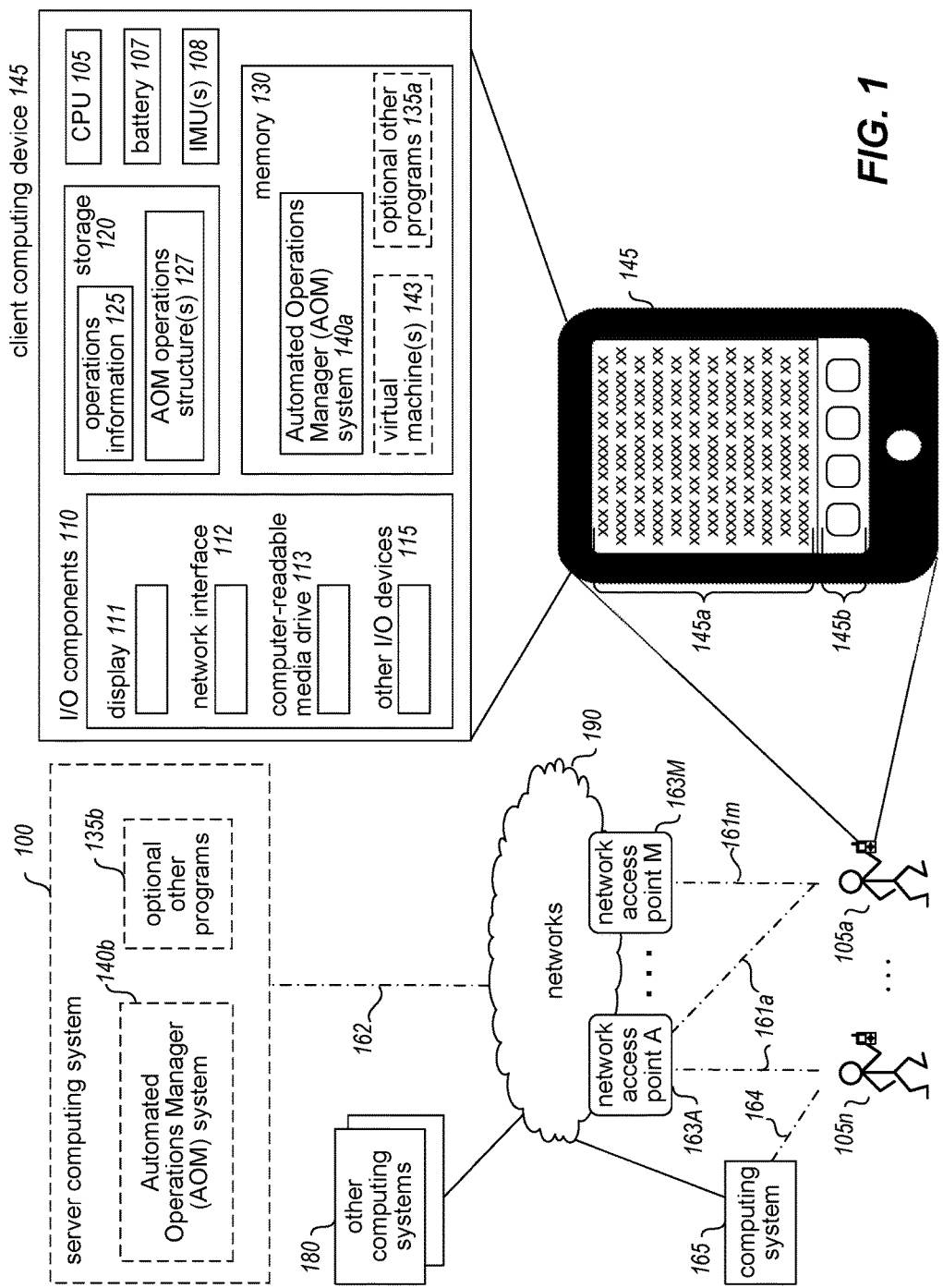
FIG. 1 is a network diagram illustrating an example environment in which a system is provided and used for automatically identifying current status of computing devices and dynamically modifying their ongoing operations, including illustrating example computing systems suitable for executing an embodiment of such a system.

Techniques are described for automatically and dynamically modifying ongoing operations of computing devices in device-specific manners, such as to automatically identify a status of a computing device and dynamically modify its ongoing operations in a resulting manner. In at least some embodiments, the techniques include identifying a likely current or imminent failure of a smart phone or other computing device based on a series of previous observed hardware attribute states of the computing device, and taking automated corrective actions to prevent or otherwise mitigate such device failure (e.g., by modifying configuration settings on the computing device or on associated systems in communication with the computing device). The techniques may include, for each of multiple device status outcomes of interest (e.g., device failure versus device non-failure), generating a state-space outcome model representing devices that reach that status outcome within a time period of interest, based in part on data about series of prior device attribute states observed for those devices over multiple time periods before those device status outcomes are reached—such generated outcome models may include, for example, a failure model representing devices that reach a failure status (e.g., have a partial or complete device failure) within that time period, and a non-failure model representing other devices that do not reach such a failure status within that time period. After such outcome models are generated, they may be used to determine how closely their data matches a series of observed device attribute states of an additional current device of interest, with the outcome model having a best match (or "fit") optionally being selected and used to identify a likely current or imminent outcome of that current device (e.g., device failure or non-failure). Corresponding automated corrective actions may then be taken based on the identified likely current or imminent outcome. In at least some embodiments, the described techniques are performed by automated operations of a computer-implemented Automated Operations Manager (AOM) system, as discussed in greater detail below.

As noted above, in at least some embodiments, outcome models are generated to represent each of multiple device status outcomes of interest, such as to generate a state-space outcome model for a status outcome that represents client devices which reach that status outcome within a time period of interest—in embodiments in which the status outcomes of interest are device failure or device non-failure, failure and non-failure outcome models may be generated, while in other embodiments other types of status outcomes may be used (e.g., device non-failure, device screen failure, device data port failure, device antenna failure, etc.) and may each have an associated generated outcome model. The generation of such outcome models may include tracking and storing status information for each of a number of devices over multiple time periods (e.g., status for each of a number of device hardware attributes or other device attributes, also referred to herein as device attribute states), including whether and when a device has a status outcome of interest—in at least some embodiments, the multiple status outcomes may be mutually exclusive at a given time, such that a device can only be in one status outcome at a time, and optionally is always in one of the status outcomes (e.g., in a non-failure status outcome if none of the failure outcomes have occurred). The various devices may then be grouped based on the multiple status outcomes, such that each status outcome has an associated group including those devices that reach that status outcome.

The data for a group of devices associated with a status outcome may then be analyzed to generate an outcome model for that status outcome. The analysis and model generation may, in at least some embodiments, include generating nodes to represent multiple non-observable (or "hidden") attributes of a device for which data is not automatically observed, but which affect the ongoing operations of the device, such as to have a causal or otherwise correlated effect on the observable device attributes—in at least some embodiments, the multiple observable device attributes may be mutually exclusive at a given time and/or the multiple non-observable attributes may be mutually exclusive at a given time. Aggregated observed status data for the devices in the group may then be analyzed to determine the following for each such non-observable attribute: an initial probability or other likelihood that each of the observable device attributes is present for a client device if that non-observable attribute is present (e.g., with a total of 100% probability across the observable device attributes for that non-observable device attribute), also referred to at times as an emission matrix—as a non-exclusive example, if an antenna failure is a non-observable attribute, it may cause an observable attribute of a dropped call and/or data transmission speed problem; an initial probability or other likelihood that the non-observable attribute is present for a client device in the absence of other evidence or information (e.g., with a total of 100% probability across the non-observable device attributes), also referred to at times as part of an initial state matrix; and an initial probability or other likelihood that a client device having that non-observable device attribute will in a next time period have each of the non-observable device attributes (e.g., with a total of 100% probability across the non-observable device attributes for that non-observable device attribute), also referred to at times as part of a transmission matrix. In some embodiments, an outcome model may be generated using one or more Kalman filter data structures using a linear quadratic estimation (LQE) algorithm, as discussed in greater detail below, while in other embodiments outcome models may be generated and represented in other manners. Additional details related to non-exclusive examples of generating such outcome models are included below with respect to FIGS. 2A-2F.

As is also noted above, in at least some embodiments, generated outcome models are used to identify a likely current or upcoming outcome status for a particular additional client device of interest based at least in part on a series of observed device attribute states of that additional current device. For example, the series of observed device attribute states of that additional current device may be matched to the information for each of the outcome models to identify the outcome model with a best fit (or more generally with a fit that exceeds a defined threshold), and the corresponding outcome status for that outcome model may be identified as a likely current or upcoming outcome status for the additional client device. In some embodiments, the determination of a fit or match for the additional client device's observed device attribute states to an outcome model may include beginning with the initial state matrix, emission matrix and transmission matrix for that outcome model, and then adjusting the probabilities for the additional client device based on its observed device attribute states. The adjustment may include, for each time at which observed device attribute state values are available, estimating what their current values would be given the current probability information for the non-observable device attribute states (optionally along with uncertainties for the observed device attribute states' estimated current values), and then updating those estimates based on the actual observed device attribute state values for the next time (e.g., using a weighted average, and optionally giving more weight to the estimates with higher certainty). In this manner, even if the observed device attribute state values of the additional client device have some inaccuracies (e.g., statistical noise), the updated estimates over time increase the accuracy relative to measurements at a single time, allowing both historical and current changing information to be combined. Additional details related to non-exclusive examples of using such outcome models are included below with respect to FIGS. 2A-2F.

In at least some embodiments, once a likely current or upcoming outcome status for a particular additional client device of interest is identified based on one or more generated outcome models, various types of corresponding automated corrective actions may then be taken to prevent or otherwise mitigate at least some types of outcome states (e.g., a predicted upcoming device failure, while not taking any corrective action if non-failure is predicted). Such corrective actions for a smartphone computing device or other client device may include modifying operations of the client device, such as by modifying configuration settings affecting use of one or more of the device's battery, memory, storage and network communications, so as to temporarily or permanently replace or supplement one type of failed device capability with another complementary capability (e.g., to use a cellular connection in place of a Wi-Fi attribute failure; to use wireless data transfer if a physical data port fails; etc.), to reduce use of device capabilities associated with an upcoming device failure (e.g., to reduce use of memory or storage if an associated failure is predicted), etc.—such corrective actions may, for example, extend the amount of time before the corresponding type of device failure occurs, or in some cases prevent the device failure. In other embodiments and situations, other types of corrective actions may be performed, including modifying operations of other devices that interact with the additional client device, initiating a replacement of the additional client device if its predicted device failure cannot be effectively mitigated, etc.

More generally, non-exclusive examples of modifying operations of a smartphone computing device may include corrective actions to alter configuration settings affecting use of one or more of the device's hardware components (e.g., battery, memory, storage network interface, etc.), affecting use of the device's operating system functionality (e.g., use of virtualization, size of buffer space, etc.), affecting use of the device's executing programs (e.g., to shutdown, start, change version of or otherwise update, change priority or otherwise change operation), etc. Device attributes may analogously include any measurable aspect of a client device that reflects its performance or otherwise reflects its operation, including with respect to one or more hardware components, configuration settings (e.g., with respect to use of hardware components, use of an operating system, use of one or more application programs, etc.)—furthermore, in at least some embodiments, attributes of a device may include aspects of one or more users of the device if they can alter performance on the client device (e.g., corresponding to usage patterns or other user interactions with the device). Particular corrective actions or types of corrective actions to perform for corresponding predicted likely status outcomes may be determined in various manners in various embodiments, including to be predefined by an operator of the AOM system, to be automatically learned (e.g., based on observed actions taken for devices having a particular status outcome, optionally combined with a measured effect of the action), to be dynamically suggested at a time of the predicted likely status outcome by an associated user, etc. While various examples of device attributes, action attributes and performance measures/effects are included herein, it will be appreciated that the described techniques are not limited to these exemplary details. Additional details related to non-exclusive examples of performing corrective actions to prevent or mitigate an identified likely current or upcoming status outcome are included below, including with respect to the examples of FIGS. 2A-2F.

The described techniques may provide a variety of benefits and advantages. Non-exclusive examples of such benefits and advantages include the following: improving operations of individual client computing devices and/or fleets or other groups of related client devices; performing automated analysis of training data to generate and/or adapt/update device outcome models, including to reflect monitored actual performance and status of client devices having different device outcomes of interest; managing very large datasets of actual performance data, potentially for millions or more client devices and for multiple device outcomes; etc.

For illustrative purposes, some embodiments are described below in which specific types of operations are performed, including with respect to using the described techniques with particular types of client devices, device attributes, and/or resulting prevention or other mitigation actions. These examples are provided for illustrative purposes and are simplified for the sake of brevity, and the inventive techniques may be used in a wide variety of other situations, including with other types of automated analyses of likely ongoing or upcoming status outcomes—accordingly, it will be appreciated that the described techniques are not limited to use with the example embodiments discussed below.

FIG. 1 is a network diagram illustrating an example environment in which a system is provided and used for automatically identifying current status of computing devices and dynamically modifying their ongoing operations, including illustrating example computing systems suitable for executing an embodiment of such a system.

In particular, FIG. 1 illustrates example users 105 who each has a client computing device that has one or more types of wireless communication capabilities, such as smartphone computing devices or other mobile computing devices (e.g., a tablet, laptop, etc.), although in other embodiments some or all such client devices may be fixed-location devices and/or may not support wireless communications. The handheld client computing device 145 of example user 105a is illustrated in additional detail, such as to include a smartphone device or tablet device with a touch-sensitive display. In this example, the display is separated into sections 145a and 145b by a graphical user interface ("GUI") displayed on the device 145, with the portion 145b being used in this example to provide user-selectable functionality controls (e.g., buttons or icons), and the separate portion 145a being used to display or otherwise present various information to the user. It will be appreciated that in other embodiments a device may have other types of GUIs (or no GUI).

In the illustrated embodiment, additional details are further shown regarding example internal components of the client device 145. In particular, in this example, client device 145 is suitable for performing at least some of the described techniques, such as by executing an embodiment of an Automated Operations Manager (AOM) system 140a, as discussed further below. The example device 145 includes one or more hardware central processing unit ("CPU") processors 105, various hardware input/output ("I/O") components 110, storage 120, memory 130, one or more batteries 107 and one or more IMUs (inertial measurement units). Illustrated I/O components in this example embodiment include a display 111 (to provide the visual display area 145a and 145b), a network connection interface 112, a computer-readable media drive 113, and other I/O devices 115 (e.g., wireless or attached keyboards, mice or other pointing devices, microphones, speakers, cameras, other sensors, etc.). Other types of hardware components may additionally be present (e.g., other processors, such as a GPU, or graphics processing unit; etc.), but are not illustrated in this example.

An optional server computing system 100 and other network-accessible computing systems 165 and 180 are also illustrated, and may each have internal components similar to those of client device 145, although corresponding details are not illustrated in this example for the sake of brevity. In embodiments in which the device 145 includes wireless communications capabilities (e.g., Wi-Fi, a cellular connection, etc.), the device 145 may communicate with some or all of the other computing systems 100 and 180 over one or more intervening networks 190 via communications 161 with one or more network access points 163 (e.g., Wi-Fi routers, cellular towers and/or base stations, etc.), such as to perform further interactions 162 with the server computing system 100 (e.g., to provide information about performance of the device 145) and/or with the other computing systems 180. Similarly, if a particular client device (e.g., the client device of user 105n) is near a local computing system such as system 165 and has short-distance wireless communications capabilities (e.g., Bluetooth, infrared, RFID, NFC, etc.) supported by that local computing system, the client device may similarly communicate with that local computing system via communications 164, and optionally via that local computing system with other computing systems (e.g., computing systems 100 and 180) over network 190. In other embodiments, such interactions may instead occur in manners other than via wireless communications, such as to perform such interactions at a later time via a wired or cabled connection (e.g., if the client computing system 145 does not include wireless communications, and/or if the optional AOM System 140b on server computing system 100 later performs its operations in an offline or batch mode).

In the illustrated example, one or more embodiments of the AOM System 140 may be in use to perform some or all of the described techniques, such as an AOM System copy 140a that is executing in memory 130 of the client device 145, and/or an AOM System copy 140b on server computing system 100. The AOM system 140a and/or 140b may automatically and dynamically identify a current or likely future outcome status of client device 145 and dynamically modify its ongoing operations or otherwise take corrective actions in a resulting manner based on that identified status, such as in a real time or near-real time manner. As discussed in greater detail elsewhere, such identification of the current or likely future outcome status of a client device may include using one or more stored AOM operations structures 127 (e.g., device outcome models) that were previously generated based on data about numerous other client devices. Additional details related to generation and use of such decision structures are included elsewhere herein, including with respect to the examples of FIGS. 2A-2F.

In addition, such automated corrective actions may be performed to prevent or otherwise mitigate an undesirable likely current or future outcome status of the client device 145, including in some cases to modify one or more stored configuration settings or other information 125 on the client device 145 that affects ongoing operations, while in other embodiments may include interactions with other systems or devices (e.g., with other devices or systems 100, 163, 165 and/or 180 to alter their interactions with the client device 145, such as to change priority of packets or other communications being sent to and/or from the client device 145, or to otherwise alter how and when such communications are handled; to initiate the replacement of client device 145 with another device if an upcoming failure of client device 145 is likely, optionally after notification to and/or approval by the user who owns, controls or is otherwise using the client device 145; etc.). Such modification actions of client device 145 may include, for example, one or more of the following: to change use of a buffer area of the memory (e.g., used to temporarily store information being streamed to the client device, such as to enable or disable use of the buffer area, to increase or decrease the size of the buffer area, etc.), such as to reduce errors or problems related to inter-device communications and/or to improve battery use; to change use of optional virtualization on the client device (e.g., used to provide one or more virtual machines 143 that each simulates a physical machine for use in executing one or more programs separately from other programs, such as to enable or disable use of the virtual machine(s), to increase or decrease the size and/or quantity of the virtual machine(s), etc.), such as to improve performance of the CPU(s), storage, memory, battery, etc.; to change execution of one or more optional other programs 135*a* (e.g., to start, stop or modify execution of one or more such other programs, including to change associated priorities of the other programs; to update or otherwise change versions of one or more operating system programs and/or application programs; etc.), such as to improve performance of the CPU(s), storage, memory, and/or battery; etc.

In at least some embodiments in which a copy of the AOM system executes on a client device such as client device 145, that AOM system may operate to prevent or mitigate likely current or upcoming problems with operations of that client device in a manner specific to that client device. In other embodiments in which a copy of the AOM System 140 executes on one of the other computing systems, such as AOM System 140*b* on server computing system 100, the AOM System 140*b* may interact with numerous client devices (e.g., client devices of some or all of users 105*a*-105*n*) to similarly prevent or mitigate likely current or upcoming problems with operations on each of those client devices in a device-specific manner, with the number of client devices possibly being in the millions, tens of millions, hundreds of millions, etc. Such an optional server computing system 100 may further execute one or more optional other programs 135*b*, such as to provide information to or otherwise interact with the client devices of the users 105. Additional details regarding operations of embodiments of the AOM System are included below.

It will be appreciated that the illustrated computing systems and devices are merely illustrative and are not intended to limit the scope of the present invention. For example, network 190 may include portions of the Internet, a private network (e.g., a corporate network), a cellular network, or any other networks, including combinations of one or more such networks. In addition, computing system 100 and/or client device 145 may be connected to other devices that are not illustrated, including through one or more networks such as the Internet or via the Web. More generally, a "client" or "server" computing system or device may comprise any combination of hardware that can interact and perform the described types of functionality, such as when programmed or otherwise configured with software, including without limitation desktop computers, laptop computers, slate computers, tablet computers, embedded computers, specialized hardware such as ASICs ("application-specific integrated circuits") or other computers, smart phone computing devices and other cell phones, Internet appliances, PDAs and other electronic organizers, database servers, network storage devices and other network devices, wireless phones, pagers, television-based systems (e.g., using set-top boxes and/or personal/digital video recorders and/or game consoles and/or media servers), and various other consumer products that include appropriate inter-communication capabilities. For example, the illustrated system 140 and/or its components may include executable software instructions and/or data structures in at least some embodiments, which when loaded on and/or executed by particular computing systems or devices may be used to program or otherwise configure those systems or devices, such as to configure hardware processors of those systems or devices. Alternatively, in other embodiments, some or all of the software components and/or systems may execute in memory on another device and communicate with the illustrated computing system/device via inter-computer communication. In addition, while various items are illustrated as being stored in memory or on storage at various times (e.g., while being used), these items or portions of them can be transferred between memory and storage and/or between storage devices (e.g., at different locations) for purposes of memory management and/or data integrity. Furthermore, the functionality provided by the illustrated system components may in some embodiments be combined in fewer components or distributed in additional components. Similarly, in some embodiments the functionality of some of the illustrated components may not be provided and/or other additional functionality may be available.

Thus, in at least some embodiments, the illustrated components and/or systems are software-based components/systems including software instructions that, when executed by the CPU(s) 105 and/or CPU(s) of system 100 and/or other hardware processor means, program the processor(s) to automatically perform the described operations for that component/system, including to use and execute routines and other algorithms as described herein. Furthermore, in some embodiments, some or all of the components and/or systems may be implemented or provided in other manners, such as at least partially in firmware and/or hardware means, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems, components or data structures may also be stored (e.g., as software instructions contents or structured data contents) on a non-transitory computer-readable storage medium, such as a hard disk or flash drive or other non-volatile storage device, volatile or non-volatile memory (e.g., RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

FIGS. 2A-2F are diagrams illustrating examples of generating and using state-space outcome model data structures for automatically identifying current status of computing devices and dynamically modifying their ongoing operations.

In particular, FIG. 2A illustrates an example of tracking and storing information about a series of previous observed device attribute states 205 of an example client computing device XXX (e.g., a smart phone, not shown) for each of a series of time periods (shown in this example as times T-4, T-3, T-2 and T-1, such as every millisecond, every second, every minute, every hour, every day, etc.), along with a resulting observed status outcome state 212. In this example, the possible status outcome states 212 are a device failure or a device non-failure, and the observed device attribute states 205 reflect observable attributes of the device that correspond to hardware components of the device and may be automatically determined (e.g., by sensors on the device), such as packet loss, device restarts (or power cycles), application load time, application crashes, connection speed, dropped calls, screen capacitance, accelerometer data (e.g., to indicate a rapid deceleration consistent with a dropped device), etc. In other embodiments, a variety of other device attributes may be tracked and used, whether instead of or in addition to the illustrated observed device attributes, with non-exclusive examples including frequency and types of different communication connections (e.g., via Wi-Fi versus a cellular connection), versions of programs, a type of operating system, information about screen swipes (e.g., continuity of gestures), etc.

In this illustrated example, no anomalous device attribute state values are observed at time T-4 (e.g., each of the illustrated device attributes has a value, not shown, in a normal range), such as illustrated by the nodes corresponding to the device attribute state values being shown without a bolded exterior line. However, an anomalous packet loss device attribute value is observed at time T-3 (e.g., packet loss above a defined threshold), an anomalous dropped calls device attribute value is observed at time T-2 (e.g., a quantity of dropped calls above a defined threshold), and an anomalous device restart device attribute value is observed at time T-1 (e.g., a quantity of device restarts above a defined threshold), with each of those corresponding nodes illustrated with a bolded exterior line. In addition, the observed status outcome states at times T-4, T-3, T-2 and T-1 are device non-failure, device non-failure, device non-failure, followed by device failure, respectively, with the corresponding nodes for those observed status outcome states being shown with a bolded exterior line. In this example, the status outcome states are mutually exclusive (i.e., either device failure or device non-failure, but not both), as are the observed device attribute states (e.g., with a "packet loss" attribute representing a packet loss problem but not a problem with any of the other observed device attributes), although in other embodiments the status outcome states and/or observed device attribute states may have other forms (e.g., to be overlapping, so as allow multiple to be simultaneously observed).

FIG. 2A further illustrates that there may be other device attributes 210 that are not automatically observable by sensors on the device but that may have a causal or otherwise correlative effect on the observed state attributes 205, with examples in FIG. 2A shown of a cracked screen, data port failure, antenna failure, etc. In this example, none of the non-observable device attributes 210 are anomalous at time T-4, but an anomalous antenna failure (whether intermittent or permanent) occurs (but is not automatically observed) at time T-3 that contributes to the observed anomalous packet loss device attribute value at that time, with that anomalous antenna failure continuing at times T-2 and T-1 to contribute to the observed anomalous dropped calls device attribute value at time T-2 and observed anomalous device restart device attribute value at time T-1, and with the eventual observed device failure status outcome at time T-1 being caused at least in part by the antenna failure (e.g., by an intermittent failure that eventually worsens to the point that the device completely fails or otherwise becomes effectively unusable). As with the other nodes, the illustrated nodes for the anomalous antenna failure non-observable device attribute state at times T-3, T-2 and T-2 are shown with a bolded exterior line. Since computing device XXX eventually fails during the time period being monitored, it will be part of a group of numerous computing devices that are used to generate an outcome model for the failure status outcome. It will be appreciated that the monitoring for such an example computing device may occur for much larger numbers of time periods (e.g., for days, weeks, months, years), and that such information may be gathered for numerous computing devices (e.g., hundreds, thousands, millions, etc.), such as by a telecom service provider that provides telecommunication services to the devices.

Figure 2B:
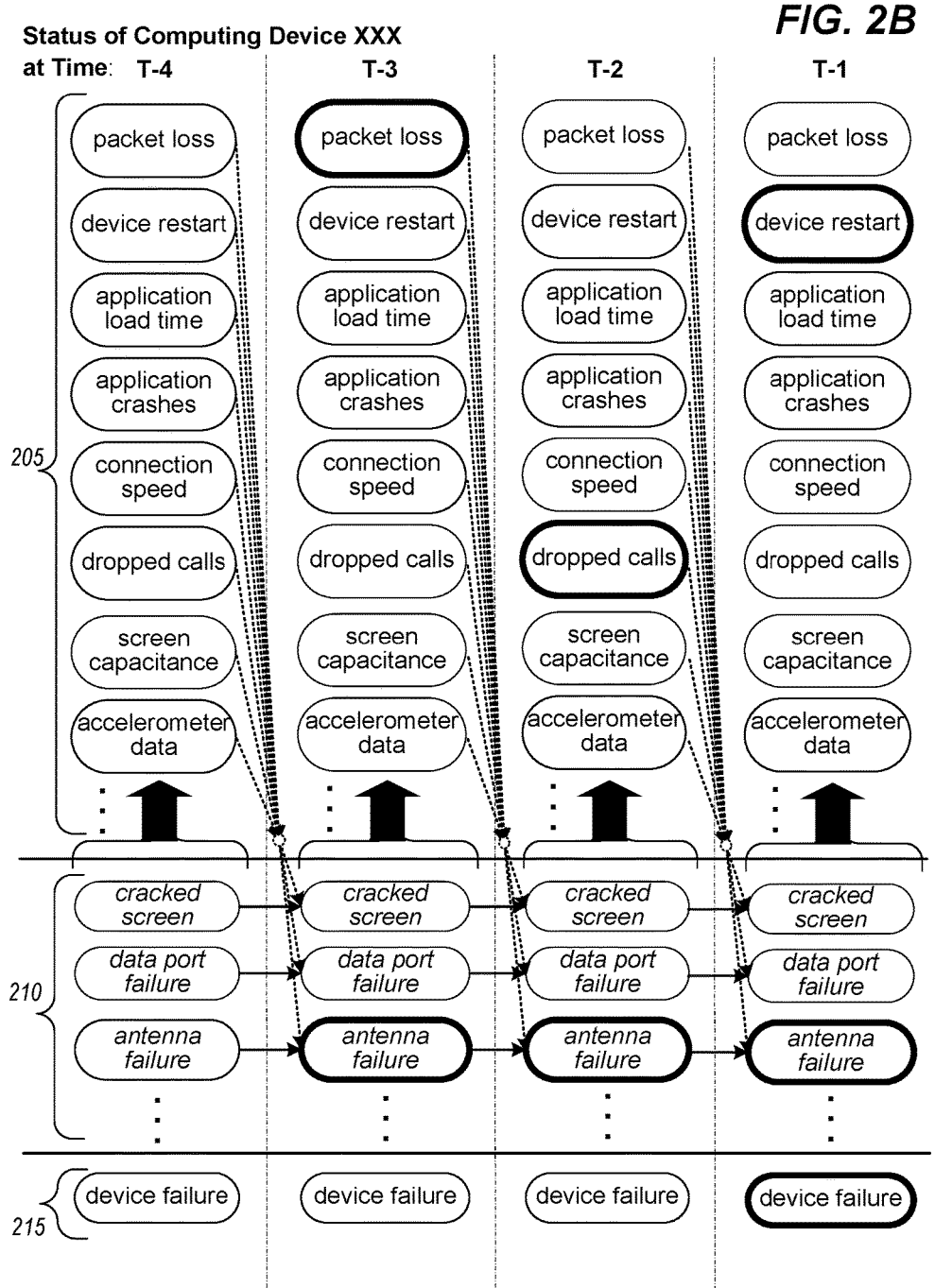

FIG. 2B continues the example of FIG. 2A, and illustrates how the observed data for computing device XXX may later be analyzed, typically along with observed data for numerous other computing devices that similarly fail, as part of generating a failure outcome model to represent those devices. In particular, as part of generating the outcome model, a number of non-observable device attribute states are modeled to correspond to hidden factors affecting device operation—in this example, the non-observable device attribute states 210 that are shown are labeled for the purpose of illustration, but in at least some embodiments and situations, the non-observable device attribute states will instead represent a quantity of unknown factors (e.g., "Hidden State 1", "Hidden State 2", etc.). As illustrated by the large black arrows pointing from the non-observable device attribute states 210 to the observed device attribute values 205, those observed device attribute values 205 at a given time are caused in part or in whole by the non-observable device attribute states 210. In addition, the arrows between time periods illustrate that the values at a time period are modeled as being directly influenced only by the prior time period—thus, the status of the non-observable device attribute states 210 at time T-2 depend only on the status of those same non-observable device attribute states 210 at previous time T-3 and on the values of the observed device attribute values 205 at previous time T-3. Since FIG. 2B illustrates part of the generation of a failure outcome model, only the observed device failure outcome status state 215 is shown, although a similar analysis will be performed to generate a non-failure outcome model using observed data from other computing devices that do not fail.

FIG. 2C continues the examples of FIGS. 2A-2B, and illustrates probabilistic relationship information that is determined for the generated failure outcome status based on the analysis of the observed data for the numerous failed computing devices. In particular, the illustrated information includes an initial state matrix 225 that includes, for each of the non-observable device attribute states, an initial probability or other likelihood that the non-observable attribute is present for a client device in the absence of other evidence or information (e.g., with a total of 100% probability across the non-observable device attributes). The illustrated information also includes an emission matrix 220 that includes, for each of the non-observable device attribute states, an initial probability or other likelihood that each of the observable device attributes is present for a client device if that non-observable attribute is present (e.g., with a total of 100% probability across the observable device attributes for each non-observable device attribute). The illustrated information further includes a transition matrix that includes, for each of the non-observable device attribute states, an initial probability or other likelihood that a client device having that non-observable device attribute will in a next time period have each of the non-observable device attributes (e.g., with a total of 100% probability across the non-observable device attributes for each non-observable device attribute). It will be appreciated that similar information will be generated for the non-failure outcome model, but with different determined probability information based on using different observed data from other computing devices that do not fail.

Figure 2D:
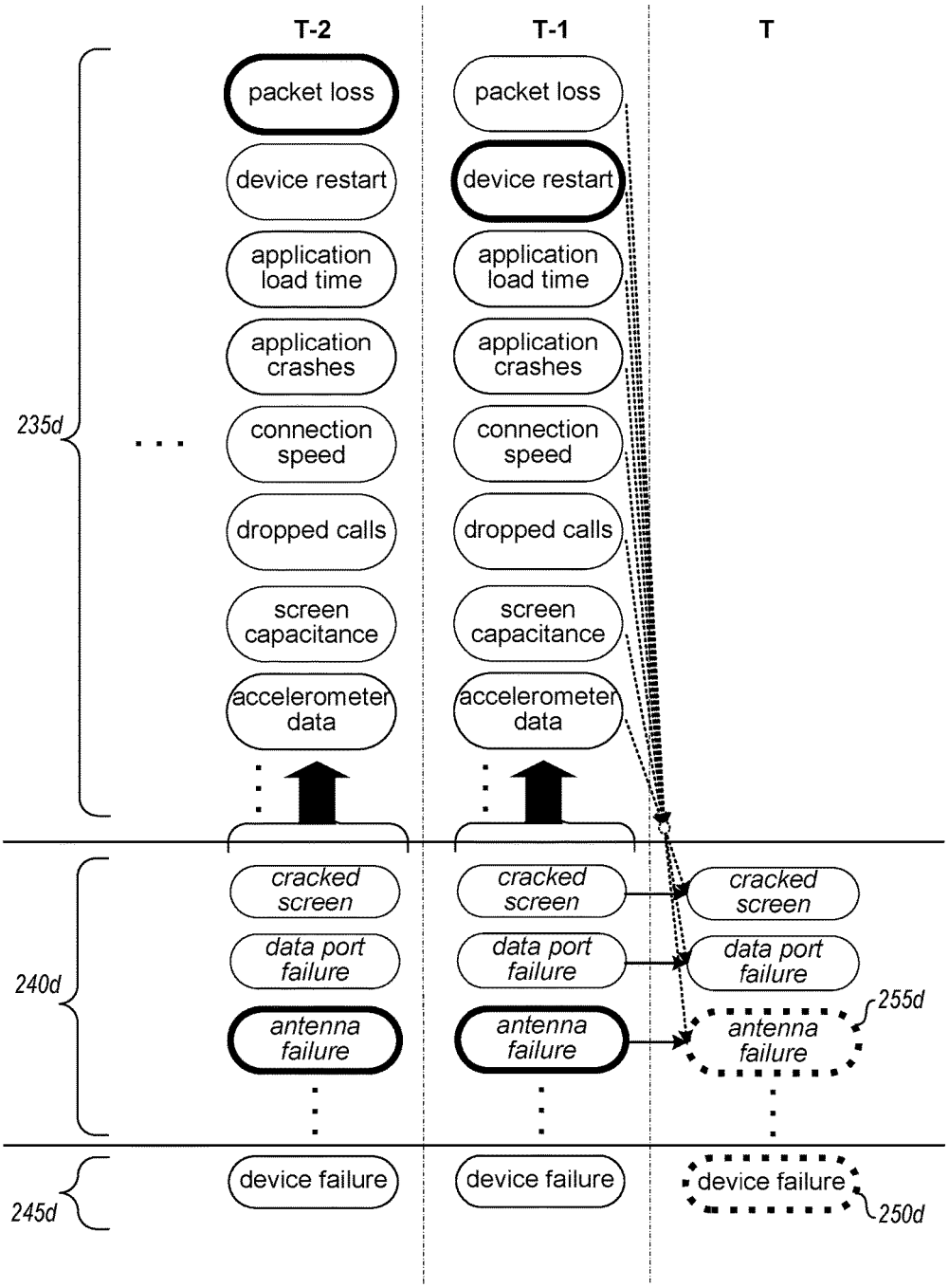

FIG. 2D continues the examples of FIGS. 2A-2C, and in particular shows using the generated failure outcome model to predict whether an additional client computing device YYY will imminently fail. In this example, various observed device attribute values 235d are observed for computing device YYY at multiple times (while observed data for only two example time periods T-2 and T-1 is shown, the prediction would normally be performed using observed data for more time periods), as well as observed non-failure status outcome states 245d at times T-2 and T-1. Using the determined probabilistic relationship information for the generated failure outcome model (not shown), the series of observed device attribute state values over time are used to determine a predicted probability or other likelihood that the computing device YYY will also fail at a future time (e.g., in one or more next time periods after the observations)—in this example, the observed packet loss attribute at time T-2 and observed device restart attribute at time T-1 may be caused at least in part by a non-observed but existing antenna failure problem 240d at those time periods, and the resulting prediction from the failure outcome model for time T is a future device failure 250d (e.g., a predicted probability or other likelihood above a defined threshold), as well as a continuing non-observed antenna failure 255d at time T. As previously noted, in at least some embodiments and situations, the non-observable device attribute states will represent a quantity of unknown factors that are not labeled in the manner of the example.

Figure 2E:
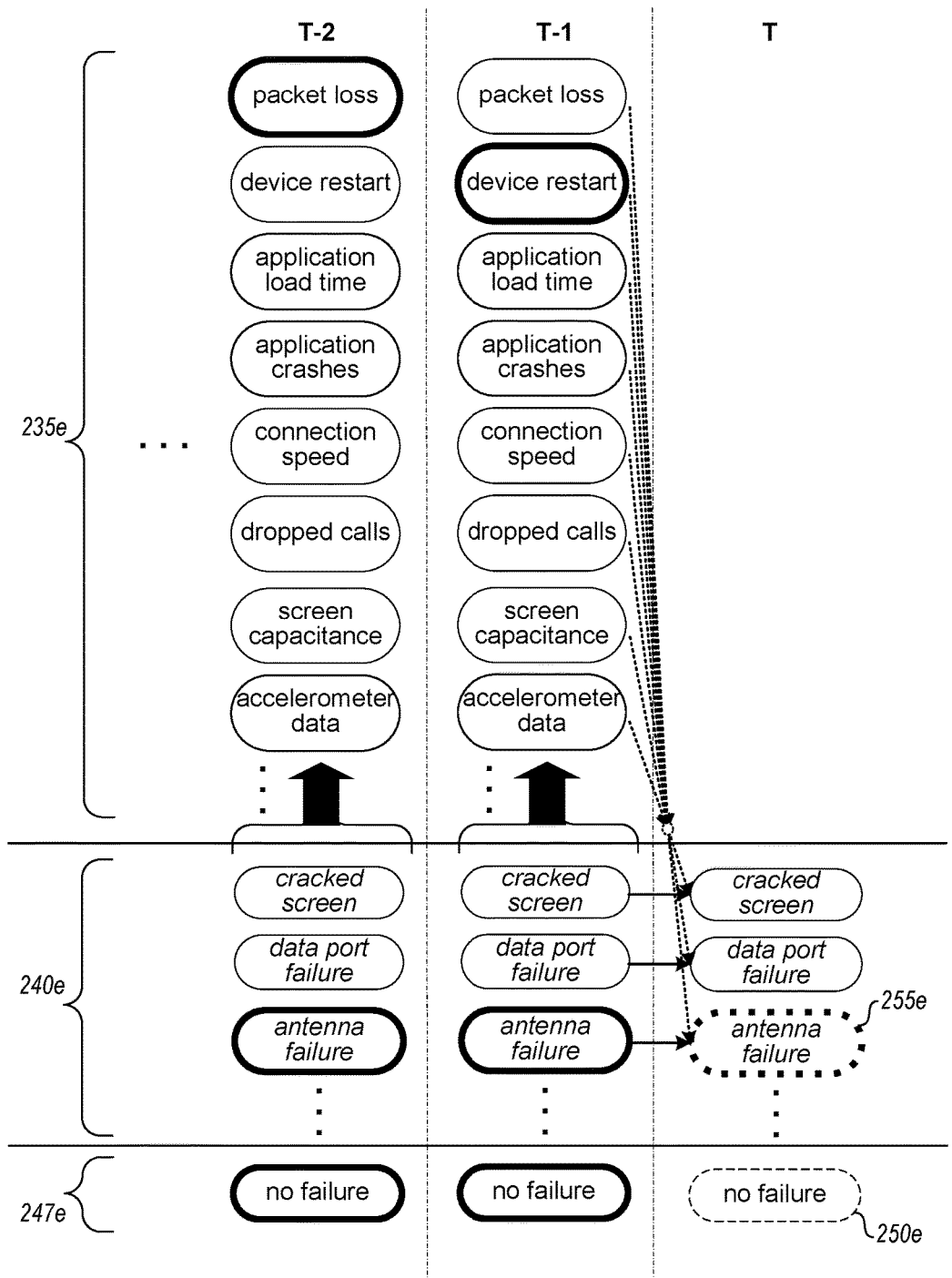

FIG. 2E continues the examples of FIGS. 2A-2D, and in particular shows using a corresponding generated non-failure outcome model to predict whether the same additional computing device YYY will remain in a non-failure status outcome without failing. In this example, the various observed device attribute values 235e and non-observed device attribute states 240e are the same as in FIG. 2D, but the observed non-failure status outcome states 247e at times T-2 and T-1 show the non-failure observed state for the non-failure outcome model. Using the different determined probabilistic relationship information for the generated non-failure outcome model (not shown), the series of observed device attribute state values over time are used to determine a predicted probability or other likelihood that the computing device YYY will continue to not fail at a future time (e.g., in one or more next time periods after the observations)—in this example, the resulting prediction from the non-failure outcome model for time T is a lack of a non-failure outcome status 250e at time T (e.g., a predicted probability or other likelihood of failure that is below a defined threshold), although a continuing non-observed antenna failure 255e at time T is predicted.

Thus, by generating and using multiple outcome models for each of multiple status outcomes, such as discussed with respect to FIGS. 2D and 2E for generated failure and non-failure outcome models, a determination may be made as to the mostly likely predicted future status outcome for a particular client device being assessed. The results from the multiple outcome models may be used in various manners, such as to combine the results from the multiple outcome models (e.g., in a weighted manner, such as to reflect associated certainties generated for each of the predictions by its corresponding outcome model), to compare the results and select one to use (e.g., one with the highest certainty, the highest predicted probability, etc.), etc.

Figure 2F:
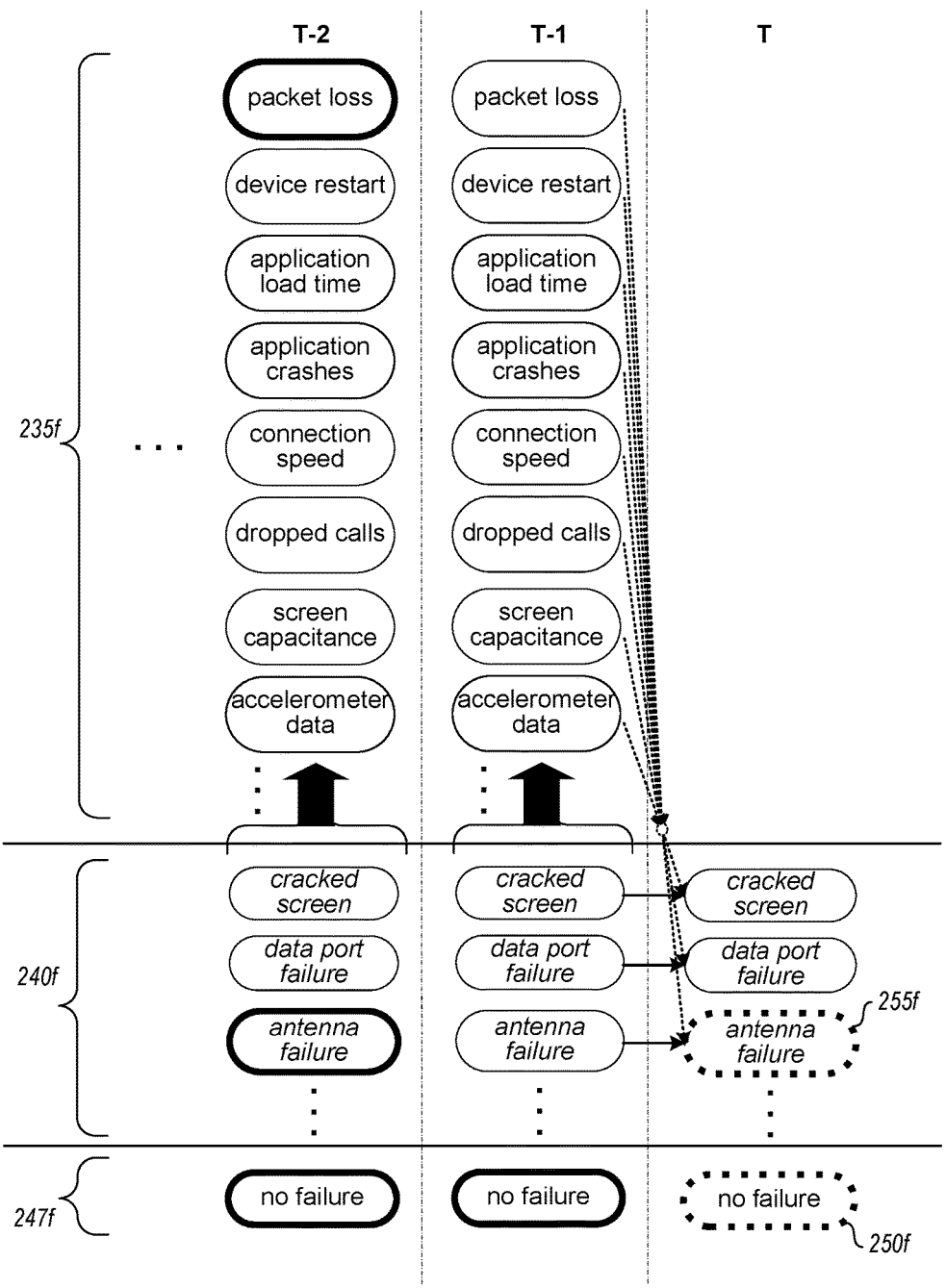

FIG. 2F continues the examples of FIGS. 2A-2E, and in this example illustrates how the same generated non-failure outcome model may be used to predict that a different client computing device ZZZ will continue to have a future non-failure status outcome at future time T, based on different observed device attribute status information for previous time periods T-2 and T-1. In particular, using the determined probabilistic relationship information for the generated non-failure outcome model (not shown), the series of observed device attribute state values 235f over time are used to determine a predicted probability or other likelihood that the computing device ZZZ will not fail at a future time (e.g., in one or more next time periods after the observations)—in this example, the observed packet loss attribute at time T-2 may be caused at least in part by a non-observed but existing intermittent antenna failure problem 240f at that time period, but the antenna failure problem and resulting observed packet loss attribute do not recur at time T-1, and the resulting prediction from the non-failure outcome model for time T is a future device non-failure 250f (e.g., a predicted probability or other likelihood of failure that is below a defined threshold), although the non-observed intermittent antenna failure 255f is predicted to return at time T in this example. As previously noted, in at least some embodiments and situations, the non-observable device attribute states will represent a quantity of unknown factors that are not labeled in the manner of the example.

While a limited number of attributes and devices and corresponding information are shown with respect to FIGS. 2A-2F, it will be appreciated that generated outcome models in other embodiments and situations may have much larger numbers of attributes and corresponding nodes and may use other types of device and user attributes, as well as to store and represent determined relationship information in other manners (including in manners that do not use probabilities). Furthermore, while various details are provided in the examples of FIGS. 2A-2F, the described techniques are not limited to these example details.

In at least some embodiments, the outcome models are generated to each include one or more hidden Markov models, such as one or more Kalman filters. For example, in embodiments using such hidden Markov models to predict likely upcoming device failure or non-failure, two hidden Markov models may be employed, with one producing the likelihood of failure and the other producing the likelihood of non-failure. The two hidden Markov models may have identical structures of observed attribute values and non-observable attribute states, but are trained on two different data sets: one contains data from devices known to have failed, the other from devices that have not failed. Then, given data from a device of unknown failure/non-failure state, the hidden Markov models produce a probability of failure and a probability of non-failure. The final determination of failure/non-failure may be made by taking the maximum of these probabilities, possibly weighted according to Bayes rule or some other weighting scheme. In other such embodiments, more than two outcome models may be generated and used, such as if the group of devices that fail is segmented into multiple sub-groups that share different characteristics (and the group of devices that do not fail is similarly segmented into multiple sub-groups that share different characteristics), and a separate outcome model is generated for each such sub-group, with particular sub-groups chosen for a client device being assessed and their corresponding outcome models used for the assessment.

With respect to such embodiments using hidden Markov models and/or Kalman filters, a hidden Markov model is a statistical Markov model in which the system being modeled is assumed to be a Markov process with unobserved (i.e. hidden) states, and it describes the joint probability of a collection of "hidden" and observed discrete random variables, using an assumption that the i-th hidden variable given the (i−1)-th hidden variable is independent of previous hidden variables, and the current observation variables depend only on the current hidden state. In the hidden Markov model, the state is not directly visible, but the output (in the form of data or "token" in the following), dependent on the state, is visible. Each state has a probability distribution over the possible output tokens. Therefore, the sequence of tokens generated by an hidden Markov model gives some information about the sequence of states; this is also known as pattern theory, a topic of grammar induction. The Baum-Welch algorithm may be used to find the maximum likelihood estimate of the parameters of a hidden Markov model given a set of observed feature vectors. The state space of the hidden variables in at least some hidden Markov models is discrete, while the observations themselves can either be discrete (typically generated from a categorical distribution) or continuous (typically from a Gaussian distribution). The hidden state space may be assumed to consist of one of N possible values, modeled as a categorical distribution. This means that for each of the N possible states that a hidden variable at time t can be in, there is a transition probability from this state to each of the N possible states of the hidden variable at time t+1, for a total of $N^2$ transition probabilities, with the set of transition probabilities for transitions from any given state summing to 1. In addition, for each of the N possible states, there is a set of emission probabilities governing the distribution of the observed variable at a particular time given the state of the hidden variable at that time. Thus, the parameters of a hidden Markov model are of two types, transition probabilities and emission probabilities (also known as output probabilities), as may be reflected in a transition matrix and emission matrix, respectively—the transition probabilities control the way the hidden state at time t is chosen given the hidden state at time t−1.

Kalman filter models may use a linear quadratic estimation (LQE) algorithm that analyzes a series of measurements observed over time, containing statistical noise and other inaccuracies, and produces estimates of unknown variables that tend to be more accurate than those based on a single measurement alone, by estimating a joint probability distribution over the variables for each timeframe. The algorithm works in a two-step process. In the prediction step, the Kalman filter model produces estimates of the current state variables, along with their uncertainties. Once the outcome of the next measurement (necessarily corrupted with some amount of error, including random noise) is observed, these estimates are updated using a weighted average, with more weight being given to estimates with higher certainty. As an example application, consider the problem of determining the precise location of a truck that is equipped with a GPS unit to provide a position estimate within a few meters (which is likely to be noisy; readings 'jump around' rapidly, though remaining within a few meters of the real position). In addition, since the truck is expected to follow the laws of physics, its position can also be estimated via dead reckoning by integrating its velocity over time, determined by keeping track of wheel revolutions and the angle of the steering wheel, which will typically provide a very smooth estimate of the truck's position, but will drift over time as small errors accumulate. In a prediction phase, the truck's old position will be modified according to the physical laws of motion (the dynamic or "state transition" model), with a new position estimate and a new covariance calculated. Next, in an update phase, a measurement of the truck's position is taken from the GPS unit. Along with this measurement comes some amount of uncertainty, and its covariance relative to that of the prediction from the previous phase determines how much the new measurement will affect the updated prediction. Ideally, as the dead reckoning estimates tend to drift away from the real position, the GPS measurement should pull the position estimate back towards the real position but not disturb it to the point of becoming rapidly jumping and noisy.

While the described techniques are used in some embodiments to assess and predict likely computing device status and optionally take corresponding corrective actions, the described techniques may be used in other manners in other embodiments. Non-exclusive examples of such other uses include the following: to predict a likely increased security risk or threat (e.g., for a client computing device), such as based on a sequence of observed attribute state values for one or more devices or other entities (e.g., device users), and to optionally take corresponding corrective actions (e.g., institute 2-factor authentication or other enhanced security measures); to predict a likely future action of a device or its user in a commercial setting such as a brick-and-mortar store, such as based on a sequence of observed attribute state values for the device and/or by the user, and to optionally take corresponding actions (e.g., provide information to the device and/or user to assist or inhibit the likely future action, to enable or disable functionality or capabilities available to the device and/or user, etc.); to predict a likely health or medical condition or other status of a patient, such as based on a sequence of observed attribute state values for the patient and/or one or more health-related devices used by the patient, and to optionally take corresponding corrective actions (e.g., notify a medical professional, provide medical or health-related advice or other information, initiate an automated medical or health-related procedure, etc.); etc. The analysis of observed attribute state values to generate outcome models for security-related status outcomes may include, for example, observing status of device attributes related to potential security-related activities (such as execution of programs, communications received and/or sent, downloads, geographical locations, program versions and updates, etc.) and/or observing status of attributes of users of devices related to potential security-related activities (such as login attempts, password changes, online sites visited, etc.), and analyzing such observed attribute state values for groups of devices/users having different types of status outcomes, including to determine probabilistic relationship information between the observed attribute state values and multiple non-observed attribute states that affect those observed attribute state values. The analysis of observed attribute state values to generate outcome models for status outcomes related to future actions of a device and/or user in a commercial setting may include, for example, observing status of device and/or user attributes related to prior activities (such as geographical locations, online sites visited, communications received and/or sent, downloads, execution of programs, program versions and updates, purchases of or indications of interest in particular products and/or services, etc.), and analyzing such observed attribute state values for groups of devices/users having different types of status outcomes, including to determine probabilistic relationship information between the observed attribute state values and multiple non-observed attribute states that affect those observed attribute state values. The analysis of observed attribute state values to generate outcome models for health-related status outcomes may include, for example, observing status of device and/or patient attributes related to prior activities and other health information (such as geographical locations, physical actions taken, medications taken, symptoms observed, etc.), and analyzing such observed attribute state values for groups of devices/patient having different types of status outcomes, including to determine probabilistic relationship information between the observed attribute state values and multiple non-observed attribute states that affect those observed attribute state values. It will be appreciated that the described techniques may be employed for other uses and in other manners in other embodiments.

Figure 3:
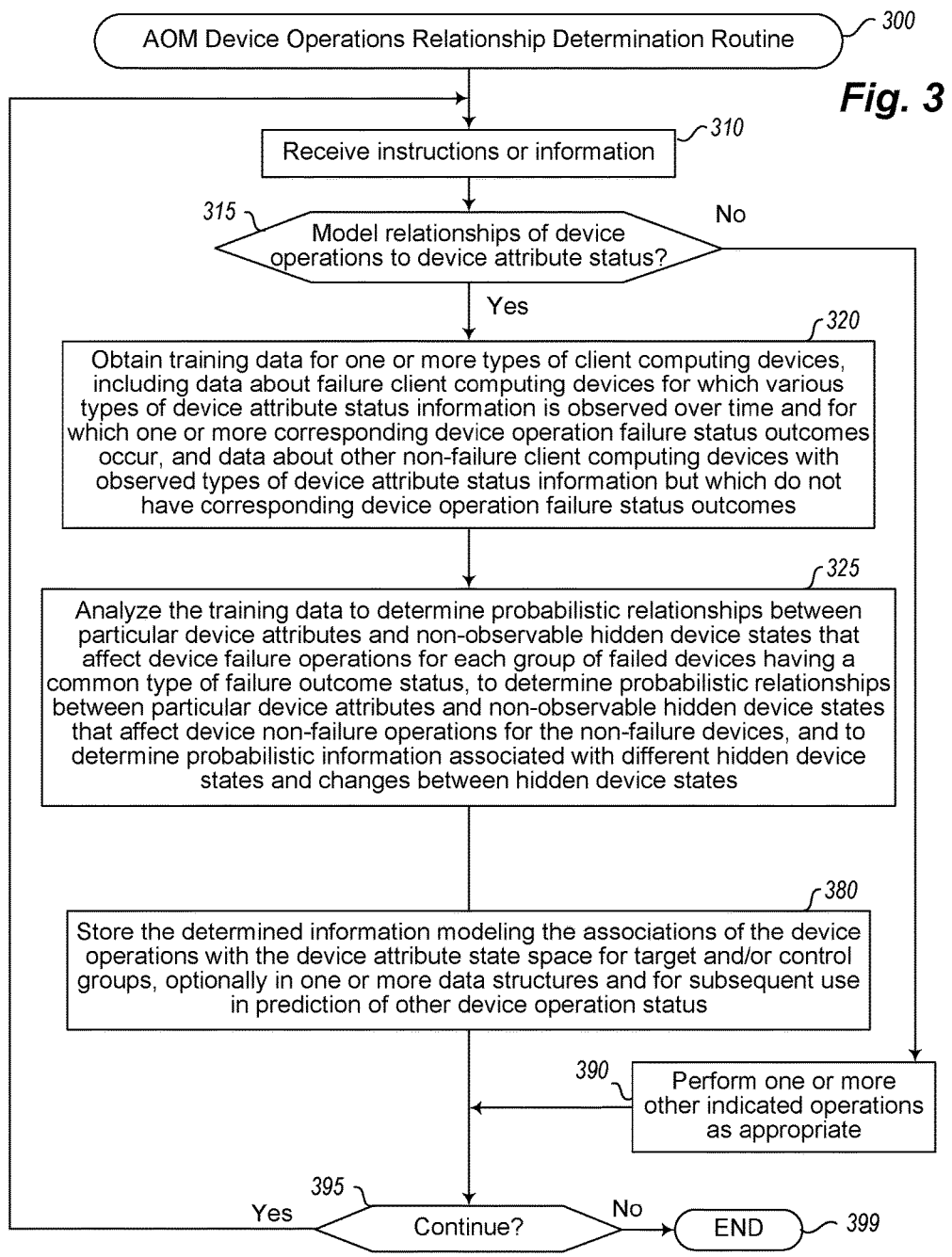
FIG. 3 illustrates a flow diagram of an example embodiment of an Automated Operations Manager (AOM) Device Operations Relationship Determination routine.

FIG. 3 illustrates a flow diagram of an example embodiment of an Automated Operations Manager (AOM) Device Operations Relationship Determination routine 300. The routine may be performed by, for example, execution of the AOM System 140a and/or AOM System 140b of FIG. 1 and/or a system used to perform the techniques described with respect to FIGS. 2A-2F or as is elsewhere discussed in the document. While the illustrated embodiment of the routine corresponds to generating outcome model data structures for a single group of status outcomes, it will be appreciated that in other situations and embodiments the routine may operate in other manners, including to generate such structures for multiple different groups and types of status outcomes for a group of client devices for which training information is available, may generate such structures for other types of status outcomes (including those not related to client devices or device failures) in other environments, etc.

In the illustrated embodiment, the routine begins at block 310, where instructions or information are received. The routine continues to block 315 to determine if the instructions or information received in block 310 are to generate outcome models having corresponding data structures for multiple status outcomes for a group of client computing devices and status outcomes that include a non-failure status outcome and one or more failure status outcomes, and if so continues to block 320. In block 320, training data is obtained for one or more types of client computing devices, including data about sequences of observed device attribute status values over time for devices that subsequently reach one of the failure status outcomes, and data about sequences of device attribute status values over time for devices that maintain the non-failure status outcome. Such training data may be initially received in block 310, or instead the routine in block 320 may retrieve stored information or otherwise interact with one or more other computing systems from which such training data is available.

After block 320, the routine continues to block 325 to analyze the training data in order to determine various types of probabilistic relationship information for outcome models for each of the possible status outcomes, including dividing the group of client computing devices into a sub-group for each of the status outcomes with devices that reach that status outcome. The analysis includes, for each of the status outcomes and its associated sub-group of devices, analyzing the sequences of observed device attribute status values over time for those devices to determine probabilistic effects that multiple non-observable device attribute states have on those observed device attribute status values, such as to generate an emission matrix that provides initial probability estimates of the occurrence of particular observed device attribute status values for each non-observable device attribute state. The analysis further includes determining probabilistic likelihood of each of the non-observable device attribute states being present in the absence of other information (e.g., as an initial state), such as to generate an initial state matrix, and, for each of the non-observable device attribute states, of that non-observable device attribute state resulting in each of the non-observable device attribute states at a next time, such as to generate a transition matrix.

After block 325, the routine continues to block 380 to store the determined probabilistic relationship information for each of the outcome models, such as in one or more generated data structures, for subsequent use in identification and prediction of likely operation statuses of other client devices.

If it is instead determined in block 315 that the instructions or information received in block 310 are not to generate outcome models, the routine continues instead to block 390 to perform one or more other indicated operations as appropriate. Such other operations may include, for example, modifying or adapting a previously generated outcome model based on new training data, such as to adjust the probabilistic information for existing outcome models, or to instead change the outcome models (e.g., add one or more new outcome models for new status outcomes) if appropriate. In addition, other types of indicated operations may include receiving and responding to various types of requests, such as a request to provide a generated outcome model or its information to one or more requestors.

After blocks 380 or 390, the routine continues to block 395 to determine whether to continue, such as until an explicit indication to terminate is received. If it is determined to continue, the routine returns to block 310, and otherwise continues to block 399 and ends.

Figure 4:
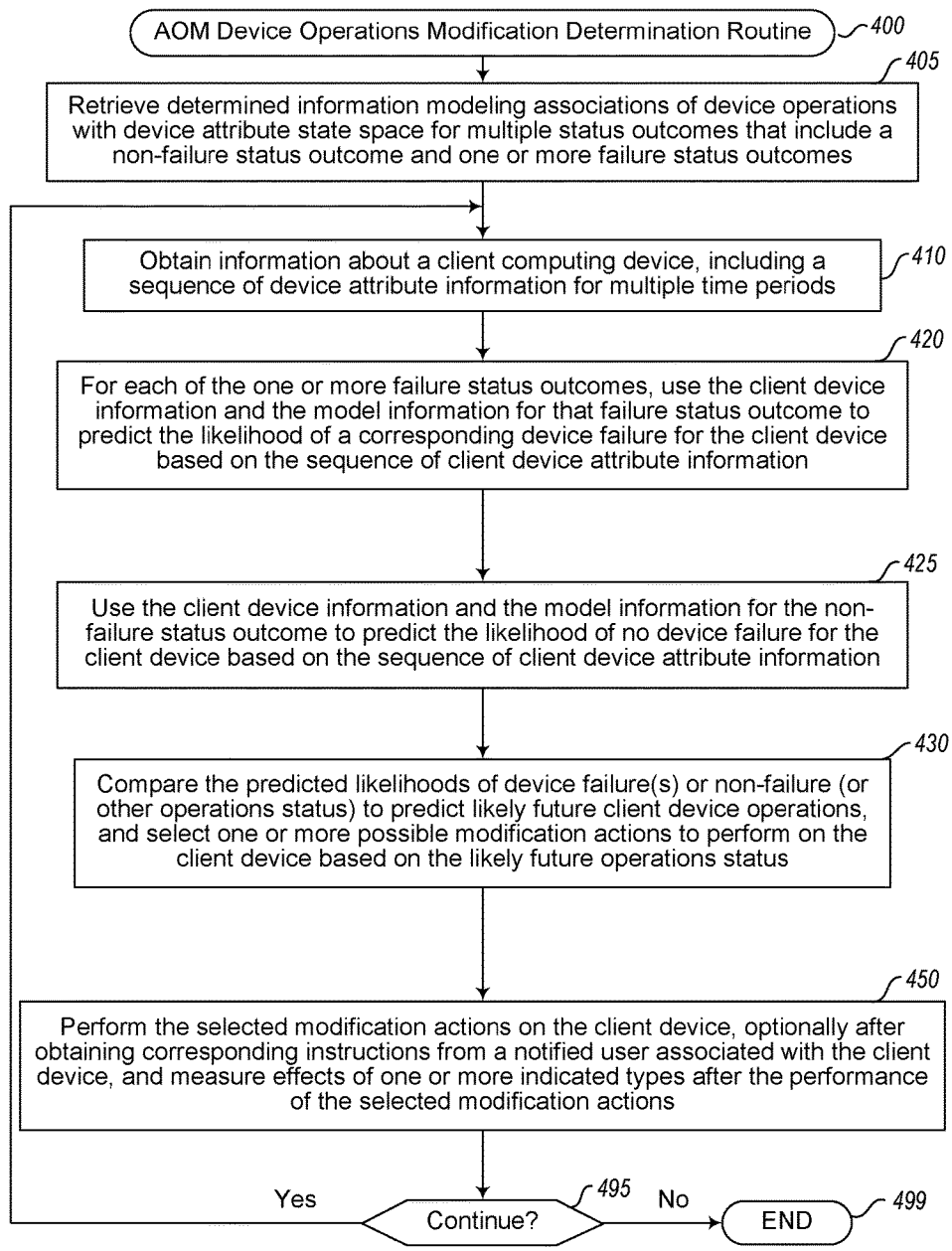
FIG. 4 illustrates a flow diagram of an example embodiment of an AOM Device Operations Modification Determination routine.

FIG. 4 illustrates a flow diagram of an example embodiment of an AOM Device Operations Modification Determination routine 400. The routine may be provided by, for example, execution of the AOM System 140a and/or AOM System 140b of FIG. 1, and/or a system used to perform the techniques described with respect to FIGS. 2A-2F or elsewhere as described herein. While the illustrated embodiment of the routine is performed with respect to a single client device, in other embodiments it may further be performed for multiple client devices.

The illustrated embodiment of the routine begins at block 405, where generated outcome models and their probabilistic modeling information are retrieved that each represents devices having an indicated type of status outcome. The routine then continues to block 410 to obtain information about a client computing device for which one or more modification actions may be performed, including obtaining information about a sequence of observed device attribute values for the client device over time.

The routine then continues to block 420 to, for each of one or more possible failure status outcomes, use the associated generated outcome model to evaluate the sequence of observed device attribute values for the client device and use it to determine a likelihood that the client device will have that type of failure status outcome, optionally with one or more indicated measures of certainty or uncertainty. In block 425, the routine then uses the generated outcome model for the non-failure status outcome to evaluate the sequence of observed device attribute values for the client device and use it to determine a likelihood that the client device will have that non-failure status outcome, optionally with one or more indicated measures of certainty or uncertainty. In block 430, the determined likelihoods for the various status outcomes are compared, in order to identify and predict at least one likely upcoming status outcome for the client device. The routine further selects, if the predict at least one likely upcoming status outcome for the client device involves a type of failure status outcome, at least one modification action to perform on the client device in an attempt to prevent or otherwise mitigate the predicted likely upcoming status outcome, although in other embodiments such modification actions may not be performed (e.g., if information about the predicted likely upcoming status outcome is instead provided to one or more other systems or other recipients for them to optionally take corresponding action), and/or corresponding actions may be selected and performed even if the predicted likely upcoming status outcome is a non-failure status outcome.

After block 430, the routine continues to block 450 to perform the one or more selected modification actions on the client device, such as by modifying configuration settings on the client device and/or on other associated devices that perform actions that affect the performance on the client device, by sending communications to and/or from the client device, etc. In addition, the routine at block 450 may optionally measure the effects (whether immediate or over a period of time, such as minutes, or hours, or days, or weeks, or months) on the client device of the performance of one or all of the performed modification actions, such as for use in later adapting or updating stored information that matches which modification action(s) to perform for which predicted like status outcomes, etc.

After block 450, the routine continues to block 495 to determine whether to continue, such as until an explicit indication to terminate the routine is received. If it is determined to continue, the routine returns to block 410 to obtain information about the next client computing device to assess, and otherwise continues to block 499 and ends. While not illustrated, outcome model changes (whether new outcome models and/or changes to existing outcome models) may also be obtained during operation of the routine and used for further assessment of client devices.

In addition, in at least some embodiments, the prediction of a likely status outcome for a client device and optionally subsequent performance of a related action may be performed in part or in whole in response to a request, such as a request from the client device (or from a user of the client device), from another device interacting with the client device, etc.—in at least some such embodiments, the prediction and/or resulting action may be performed in a real time or near-real time manner or otherwise substantially immediately after the request (e.g., within milliseconds, within a second, within seconds, within minutes, etc.). Furthermore, the prediction and/or resulting action performance may in some embodiments be performed based at least in part on information specific to the client device (including optionally to a user of the client device), such as to customize and/or personalize the prediction and/or resulting action performance to the client device (including optionally to the user)—such customization and/or personalization may be performed in various manners, such as to weight the predicted outcome status for a client device to reflect the device-specific information (e.g., to increase or decrease the likelihood of a particular status outcome, to modify how a resulting action is performed, etc.), and such as to use existing device settings or other device-specific information (e.g., preferences specified for the device and/or the device's user) for the weighting. In addition, in at least some embodiments, the prediction and/or resulting action performance may occur before or after a corresponding notification is provided (e.g., to the client device, to a user of the client device, to another specified recipient, etc.), including in some embodiments in which the notification is performed before the action in which the AOM system waits to perform the action until a corresponding confirmation or other affirmation of the action is received (e.g., from the device, from the device's user, etc.).

As noted above, an outcome model may be generated and used in various manners, including based on a variety of device attributes, and with respect to various types of resulting actions. Non-exclusive examples of generating and using outcome models are included below with various details included for exemplary purposes, including for outcome models referred to at times as churn models—any of the techniques discussed in the examples below can similarly be used for other types of outcome models discussed above. However, it will be appreciated that the described techniques are not limited to such details discussed below unless otherwise indicated.

Generally, churn indicates any subscriber who has completely stopped using the service and is unlikely to return: a subscriber lost. The subject innovations herein then are directed towards predicting whether a subscriber is likely to churn, but, has not yet stopped using the product or service. As discussed herein, it has little value to produce a churn determination after the subscriber reaches the point of no return: therefore, the models disclosed herein are directed to interact with this subscriber prior to his stopping use of the carrier's product or service and hopefully retain the subscriber. Thus, churn may be defined as a long-term reduction in activity. The specific definition of what constitutes "long term" and "reduction" may vary in different embodiments. To determine whether activity has decreased, a subscriber's activity level is computed during a window preceding a given date and again for a window after the date. If the activity level in the first period meets certain criteria (e.g., exceeds a certain threshold or contains a distinguishing event such as a large recharge) it is determined that the subscriber was recently active, and if the activity level in the second period meets other criteria (e.g., is below another threshold or contains a distinguishing event such as porting the phone number out of the carrier's network) it is determined that activity has dropped off and the subscriber is said to have churned.

One embodiment of a churn model disclosed herein is a dynamic state-space model realized within the Hidden Markov Model (HMM) framework. An HMM is a model for producing sequences with certain statistical properties. The basis for this embodiment of the churn model is to produce a pair of HMMs, one that produces sequences typical of churners and one that does so for non-churners. To determine if a subscriber is a churn risk, a behavioral sequence is constructed for that subscriber and evaluated with respect to both HMMs to determine which is a more likely generator of the sequence.

One embodiment may further include more than one HMM pair if churn/no-churn pairs are trained for different disjoint segments of the overall population. Segment definitions may, for example, take the form of criteria on subscribers, e.g., a tenure range, rather than a static list of subscribers since the user base itself is dynamic: subscribers join or leave a segment simply due the creation of new accounts and the termination of existing accounts with a carrier. Further, there may be multiple variants of the churn/ no-churn pairs for any given segment of the subscriber base because the churn models may be highly parameterized, for example, allowing for multiple definitions of churn. In such cases, a subscriber would receive multiple churn scores, one from each variant. Moreover, it can be useful to run multiple variants of the churn models in production because there are multiple uses for its output. In any event, the churn model hierarchy may be used to track individual churn/no-churn HMM pairs for multiple segments of the total subscriber base for a telecommunications provider. Segmentation (also known as partitioning, since it would typically be complete and disjoint) may be achieved by unsupervised learning methods (e.g., k-means clustering) by using static (or slowly changing) contextual data (e.g., demographic information) or behavioral data (i.e., data akin to, but perhaps distinct from the data used to build HMMs), or any of a variety of other mechanisms. A single instance of "the churn model" may actually be an instance of the churn model hierarchy and include segment definitions and associated churn/no-churn HMM pairs. This hierarchical instance of the churn model produces a single churn score for each subscriber since the subscriber's segment assignment uniquely determines the HMM pair that produces the score. Multiple churn models may also be configured for application to subscribers in a single segment by introducing variants of parameter settings. This allows, for example, short-term and long-term churn risk to be assessed separately. In this instance, multiple variants of the model may produce separate churn scores for each subscriber (one per variant). Further, the churn models may be used to track individual churn/no-churn HMM pairs for multiple versions of the same (or nearly the same) segment and parameter settings. Thus, in one embodiment previous versions of a churn model may be maintained to ensure a smooth rollout and enable a rollback when necessary. In this instance, multiple variants of the model may produce separate churn scores for each subscriber (one per variant).

The disclosed churn models are based on a sequence of actions undertaken by a subscriber. In one embodiment, the sequence includes daily measurements of subscriber actions over a prescribed time window. The subscriber actions are defined by a select set of attributes either drawn directly from the common schema or values derived from basics measurements in the common schema. The data is represented on a daily basis, in one embodiment, to provide a high resolution for which the full range of carrier reported data is typically available. However, higher resolution (e.g. every 5 minutes) or lower resolution (e.g., weekly) representations could also be used (though in the limit significant coarsening reduces the state-space modeling approach to one equivalent to standard techniques).

An activity level is a measurement of a subscriber's use of a carrier's product and/or service. Many different data sources and methods might be used to compute the activity level. Some of the activity measures may be based on a carrier's reported status. However, it is noted that at least some carriers' reported statuses lag significantly behind the moment that a subscriber actually reduces activity. Even in these cases where the carrier's reported status is delayed, the churn model can employ alternative low-latency data.

Activity Level Definition 1: Threshold on Time-Averaged Carrier Reported Status

As used herein, this activity level is defined as a percentage of days a subscriber is in the ACTIVE state during a given historical window. For example, to be considered an active subscriber a subscriber might need ACTIVE status for 80% of the days during the previous six weeks. It should be noted, however, that other values may also be used.

Activity Level Definition 2: Decreasing Trend in Time-Averaged Carrier Reported Status This activity level is defined as a rate (or appropriate proxy) at which a carrier reported status changes during a given historical window. An active subscriber then is one for whom this rate exceeds a threshold. For example, suppose a subscriber was 50% active for three weeks, then 100% active for three weeks. The rate of activity is increasing and the subscriber would be considered active. Thus, compare to Activity level definition 1, for which the subscriber would be below the 80% level over the six-week window, thus inactive. It is noted that this definition is not equivalent to a new threshold of 75% for six weeks, because the order of events is also relevant: first low activity, then high. The same values in this example, but in reverse order might then indicate a decreasing activity and a potentially inactive subscriber.

Activity Level Definition 3: Threshold on Time-Averaged Account and Usage Data

This activity level is defined as the percentage of days a subscriber meets certain account or service usage goals during a given historical window. For example, to be considered an active subscriber, a subscriber would have recharged the account on 10% of the days in the window and used voice service on a mobile device during 90% of the days in the same window. Any combination of common schema attributes might be selected, and the length of the window can be adjusted on a per-carrier basis. Also, rather than a percentage of days a service was used, a usage amount threshold might be set (e.g., a total of 20 or more SMS messages during the entire window).

Activity Level Definition 4: Clustering on Low-Pass Wavelet Filtered Carrier Reported Status Clustering based on low-frequency wavelet coefficients produces results of similar quality to the threshold approach in definition 1, but enjoys the advantage of effective automatic threshold detection. A time series of carrier reported status may be a piecewise constant function since status can, in some embodiments, change at most daily, and may take on one of a few finite values. Furthermore, it changes infrequently when represented as a daily value. In one embodiment, it can therefore be exactly represented with Haar wavelets. First, the wavelet transform is performed on the daily time series of carrier reported status. High frequency components are set to zero (i.e., a low-pass filter is applied). Since, in one embodiment, it may be desirable to cluster time series based on low frequency components, the inverse transform need not be applied. The handful of remaining wavelet coefficients may be used to represent the sequence and k-means clustering may be applied to the sequences from a representative set of subscribers. In some embodiments, there may be four qualitatively distinct clusters of subscribers that might be qualitatively (or informally) described as: always active, partially active, always inactive, and phasing out. Setting the number of centroids to values greater than four tends to refine groups within these clusters, but might not produce qualitatively new clusters.

Activity Level Definition 5: Rule Based Activity Definitions

The previous definitions have relied on a measure of activity exceeding a certain threshold, however, it can also be useful to employ rule-based definitions that determine activity by certain events or criteria. Many carriers employ such definitions to determine the carrier reported status used in Activity level definition 1 above, for example, by defining a subscriber as active if he has recharged his account within the last several days and for a certain amount (where furthermore, the number of days depends on the amount). Other examples include marking a subscriber as inactive immediately on the event that the subscriber ports a line to another carrier, regardless of other recent activity on the account. Many other variations are also possible.

Activity Level Definition 6: Combination of Basic Activity Levels

Still another way to determine the activity level is to combine two or more of the previous definitions. For example, to use a rate threshold in conjunction with an activity threshold: to be active, a subscriber must have a baseline activity level of 25% and a steady or increasing activity rate. Other approaches may also be employed.

In one embodiment, the churn model is only applied to active subscribers. It is unnecessary to apply the model to subscribers who do not have any recent account activity. Furthermore, if inactive subscribers were retained during model training, the expected quality of the model would decrease. In any event, adding a significant number of low-information data to the training set would unnecessarily increase the computational expense (measured in either time or computational resources) necessary to train the model. Thus, an active-subscriber filter is applied, based on the activity level definitions. A typical example is to use Activity level definition 1: Threshold on time-averaged carrier reported status with the most recent four to six weeks of activity and a threshold between 70% and 90%. The activity level is computed for subscribers with a complete behavioral sequence. If a subscriber joins or leaves the network during the interval defining the behavioral sequence, then that subscriber is excluded by the filter. In particular, this is indicated when a subscriber enters either the preactive or cooling states at any time during the behavioral sequence interval. For example, suppose Activity level definition 1: Threshold on time-averaged carrier reported status is used with a 30-day window and an 80% threshold. If a subscriber is ACTIVE for the first 29 days, but then enters the COOLING state on day 30, that subscriber is rejected by the filter even though he meets the 80% criteria. Patterns like this one do occur (no period of inactivity before cooling) and are an indicator of active churn: for example, if the subscriber has notified the carrier and ported his number to another network.

Using state-space models provides advantages over attempts to represent subscriber behavior as a non-sequential set of characteristics, with the state-space model explicitly representing a sequence of events. For example, if a subscriber only makes calls soon after recharging, a state-space model would capture this order of events and its important relationship by design. When constructing a state-space model, the subscriber's state is not typically something that can be measured directly. It is not captured explicitly in a carrier's data. Instead one expects to observe the side effects of a subscriber's state, e.g., calls made or recharge activity. Subscriber state is therefore considered to be "hidden" and is deduced from a subscriber's behavior. As mentioned elsewhere, the churn models discussed herein are built upon the Hidden Markov Model (HMM) framework. This approach applies certain assumptions to the more general set of state-space models. In particular, an assumption made within the HMM framework is that state transitions form a Markov process, and sequences of observations represent events which are generated by a subscriber in a given state. Using the observed sequences from many subscribers one can deduce the most likely set of model parameters to have generated the observations (i.e., train the model). Once a model is identified, one may compute the likelihood that it would generate a particular observed sequence. Given separate models, one built to recognize churners and one for non-churners, it is possible to decide whether a subscriber's recent activity is more representative of one group or the other (i.e., use the model in production). Any of a variety of mechanisms may be used to derive the HMM may be employed.

The following provides one example for use with a hidden Markov model, with the following notation used to represent elements of an HMM:

N, the number of states
M, the number of distinct observable symbols
$q_t$, the hidden state at time t
$S=\{S_i\}$, the discrete set of states
$V=\{v_k\}$, the discrete set of observables
$A=\{a_{ij}\}$, state transition probability matrix. The elements of the transition probability matrix are defined in Equation (1) as follows:

$$a_{ij}=P[q_{t+1}=S_j|q_t=S_i], 1<=i,j<=N \quad (1)$$

$B=\{b_j(k)\}$, is the distribution of observable symbols for a given state, the elements of which are given by Equation (2):

$$b_j(k)=P[v_k \text{ at time } t|q_t=S_j], 1<=j<=N \text{ and } 1<=k<=M \quad (2)$$

π, the initial distribution of states, is given by Equation (3) as follows:

$$\pi_i=P[q_1=S_i], 1<=i<=N \quad (3)$$

λ, the complete set of parameters specifying a particular HMM, alternatively referred to as "a model". It includes A, B, and π as defined above.

To employ the churn model, it is necessary to carry out the following basic tasks for each HMM:

Given an observed sequence and a fully specified HMM, compute the likelihood of the sequence under the HMM, as part of producing a prediction.

Given a set of observed sequences, find model parameters that maximize the likelihood of the observations. The model training employs this approach to fully specify each HMM.

A process to train Churn and No-Churn Hidden Markov Models (HMM) may begin by receiving customer/subscriber data. The subscriber data may be extracted from a representative set of a service provider's data set. In one embodiment, the received data is raw data from the service provider's data set (though data may also be received from other sources, e.g., provider supplied behavioral data might be augmented with publicly available social media postings). Various frontend processing may be performed on the data, where the raw data may be parsed, and mapped to a common schema. Front-end processing may also include mapping subscribers to subscriber base segments if subscriber base has been partitioned. Before actually performing training with the data, a number of data preparation steps are performed. The same data preparation steps (including active subscriber filtering) are carried out for both model training and use of the model in operation. Data preparation includes 1) selecting active subscribers with the active-subscriber filter, 2) constructing sequences of behavioral observations for the active subscribers, and 3) determining a churn label for model training and (once enough time passes for it to become available) operational model performance monitoring. For model training and calibration, the prepared data is split into independent sets for training, testing, and validation. Furthermore, the training and test sets may actually be a single train/test set for use with a cross-validation approach to model determination. Cross-validation is a process in which separate train and test sets are repeatedly chosen at random from a joint train/test set and many candidate models trained to provide information on (and furthermore reduce) the bias induced by a particular choice of training and test sets.

Next the active-subscriber filter is applied, so as to identify all subscribers who meet the chosen definition of active, based on one of the methods detailed above for determining Activity Levels. For model training, the dates are not only in the past, but are far enough in the past so that a historical record of the "future" section is available, that is, a time window following the active-subscriber window during which low activity subscribers are determined to have churned. This enables knowing of the churn/no-churn outcomes for individuals at the time of training. Further data preparation actions are performed including constructing behavioral sequences, and daily time series of subscriber behavior are constructed from common schema attributes. Several considerations are made while constructing the sequences. One such consideration includes selecting the features of interest. To improve model quality and robustness (in part by balancing the amount of available training data and model complexity, and in part by relying mainly on data expected to be available from a wide range of carriers) only a few select common schema attributes are used. To determine which features to use, many potential models are constructed and tested. The best performing models, and the features associated with them, are selected. The determination of "best" does not imply simply selecting the features which appear in the single highest performing candidate, but in selecting features common to several of the highest performing models. That is, features are selected for both absolute performance and robustness. Methods for measuring model quality are listed below.

Depending on the feature in question, it may be desirable to aggregate several discrete events in order to map the data to a daily sequence used by the model. For example, a time series of individual call duration events might be transformed into a daily variable by summing all of the call durations that occur to produce a daily total duration for each day in the sequence of days in question. Variables may also be aggregated by count as well as amount (e.g., the number of calls in a day vs. the total time on the phone in a day). If there is no activity on a given day one of two actions is typical. For usage attributes, such as call duration or recharge amount, the daily aggregate value may be set to zero. For status change attributes, such as the carrier reported status update time series, the value of the attribute persists between events on the time series: if a subscriber became ACTIVE Monday and switched in INACTIVE on Friday, then the value for the subscriber on Wednesday would be ACTIVE even though no data is reported on Wednesday in the common schema (that is, "no data" implies "no change").

Some features may be derived from the common schema data. The most prominent of these includes a feature that measures total revenue-generating activity. Revenue-generating activity represents the sum total of all revenue-generating actions taken by a subscriber. Typically this consists of outbound calls and SMS, as well as all data usage. There may be additional revenue-generating actions as well (e.g., purchase of a ring-tone). In order to add activities of different types, in particular calls to SMS to data (and so on), each type of action is measured by the amount of revenue it generates (e.g., the actual dollar amounts associated with each action). Another derived feature might include an approximate revenue-generating activity. That is, it can also be effective to use approximate dollar amounts rather than precise dollar amounts. For example, an artificial unit is established in which 10 SMS=1 minute call=10 kb data.

The following provides a non-limiting, non-exhaustive list of typical features that may be of interest for use within the churn models:
  Carrier reported status
  Recharge activity
  Revenue-generating activity (exact or approximate)
  Social network attributes (in one embodiment, derived from Call Data Records for Voice and SMS interactions). Examples are the size of an ego network or individual subscriber attributes averaged over the ego network (e.g., average ARPU, average activity level, average, revenue-generating activity). When computing values over the ego network it is useful to identify and filter out automated numbers (e.g., call centers, 800 numbers). These are either directly identified form a list of known numbers, or discovered through network analysis (for example, such numbers often connect to hundreds of thousands or millions of subscribers, far more than an individual could physically contact).

Many common schema attributes can take on a continuum of values, e.g., the daily duration of voice calls. The churn model, in one embodiment, is based on a discrete HMM in which the observed values in the daily sequence are assumed to come from a discrete set. Therefore, continuous features may be discretized in order to use a discrete HMM (other embodiments may be based on continuous HMMs). In many cases continuous variables are mapped to one of two bins: zero or non-zero. This is used for variables related to consumption, such as call duration or daily recharge amount. It may also be applied to discrete features that can take on many values such as SMS count. This discretization scheme indicates, on a daily basis, weather a subscriber used a particular service or not. Sometimes it is helpful to further quantify the non-zero values by adding more bins to the discretization scheme. One bin may still be reserved for zero usage (possibly including missing data or a second bin may be reserved for missing data if missing data is not otherwise mapped to a standard value), and the remaining bins are determined by computing quantiles over the remaining data (after removing all the zeros). For example, if three bins are specified, one is for zero values, one is for non-zero values below the median of the remaining data, and the third is for values above the median. This characterizes subscriber usage as zero, low, or high. The determination of the best discretization scheme is part of the feature selection process described above and will in part depend on the size of the training set (robust results from a smaller data set requires a simpler model and thus fewer bins).

To determine quantiles over non-zero data one of two different approaches may be used: individual normalization and group normalization. For individual normalization, the quantiles are computed on an individual subscriber basis. Suppose the three-bin scheme described above is used. By normalizing on an individual basis, high activity means high for the individual; a fixed amount may map to high activity for one subscriber and low activity for another. On the other hand, when group normalization is used, the quantiles are computed across the population; high activity is high activity across all subscribers. Individual normalization may be used alongside group normalization when interested in creating a sequence that is representative of an individual's behavior: a high spender who slashes overall spending is potentially a greater churn risk than a low, but steady spender.

For cases in which data that should be available is missing, the missing data may be handled in various manners. For example, it is standard to only record attribute values when the value changes, thus, for a given subscriber on a given day, there may be no record of a specific attribute. To address the absent data, one may interpolate values to create a daily sequence as detailed above. In another case, the absence of a value indicates that zero activity occurred (e.g., no recharges on a particular day). One potential cause of missing data is an interruption in the ingestion of carrier data. This type of interruption may be indicated by a broad gap in the data collected during the interruption. Suppose there is a one-day service interruption. Since the values used are discrete, one method that can be used (and is typically used as a fallback when others fail) is to introduce a new value for the variable that indicates missing (e.g., add a fourth bin to the previous example to get: missing, zero, low, and high). It may also be possible to make reasonable estimates of other values in such cases, but these are decided on a feature-by-feature basis. For example, event triggered time series data such as status updates it is possible that a status change occurred on the missing day but was not recorded (this could lead to inconsistencies in the time series such as two consecutive ACTIVE values, which should have had an INACTIVE value recorded on the missing day). However, status changes are relatively rare so it is reasonable, on balance, to carry forward the last recorded value in these cases (i.e., to assume that inconsistencies that arise due to a short service interruption are themselves short-lived and therefore have too small a performance impact to warrant further correction).

For model training and monitoring, it is desired to determine which subscribers are churners and which are not. This is possible after a sufficient amount of time has passed following the interval for which the behavioral sequence was determined. The churn model is a pattern matching tool. The resulting HMM models are not used to directly compute future subscriber actions, rather, separate HMMs are computed for two groups: subscribers who later churned, and subscribers who did not. The label sequence is used to determine which subscribers belong to which group. To determine which subscribers are churners in historical data, the activity level is computed from the label sequence in similar manner as used in the active subscriber filter (possibly different activity level definitions are used). Churners are those subscribers whose activity level meet certain criteria, for example, is below a set threshold or subscribers who enter the preactive or cooling state during the label sequence interval. The churners then are subscribers who were previously active (they passed through the active-subscriber filter), but are no longer active.

Additional details related to generating and using outcome models, including with respect to other types of devices and/or other types of status outcomes (e.g., sending messages to devices to cause changes in device behavior and/or behavior of users of the devices), are included in U.S. application Ser. No. 15/649,393, filed Jul. 13, 2017 and entitled "Dynamic State-Space Modeling Based On Contextual And Behavioral Factors," which is incorporated herein by reference in its entirely, and which is a continuation of U.S. application Ser. No. 14/596,764, filed Jan. 14, 2015. In addition, in some embodiments, the terms "networked services provider", "telecommunications", "telecom", "provider", "carrier", and "operator" may be used interchangeably to refer to a provider of any network-based telecommunications media, product, service, content, and/or application, whether inclusive of or independent of the physical transport medium that may be employed by the telecommunications media, products, services, content, and/or application—accordingly, references to "products/services," or the like, are intended to include products, services, content, and/or applications, and is not to be construed as being limited to merely "products and/or services." Furthermore, in some embodiments, the terms "optimized" and "optimal" refer to a solution that is determined to provide a result that is considered closest to a defined criteria or boundary given one or more constraints to the solution—thus, a solution is considered optimal if it provides the most favorable or desirable result, under some restriction, compared to other determined solutions, with an optimal solution therefore being a solution selected from a set of determined solutions. In addition, in some embodiments, the term "message" refers to a mechanism for transmitting data that may include information about an available choice, which typically is embedded within a message having a variety of attributes (e.g., how the message is presented; when the message is presented; the mechanism in which the available choice is presented, such as based a type of communications network or service; groups or collections of other attributes; a tone of voice; an urgency; etc.). In such embodiments, the available choice may further refer to a networked services provider's product, service, content, and/or application, and may be provided and/or presented using any of a variety of mechanisms (and optionally be independent of the mechanism). In addition, in some embodiments, the term "feature measure" refers to an outcome or result of an action (or non-action) to be measured and/or affected based on some input. In addition, in some embodiments, the term "user" may be used to refer to an entity that has made or is predicted to in the future make a decision regarding a product, service, content, and/or application from another entity, and in some situations may include not just an individual but also businesses, organizations, or the like.

Those skilled in the art will appreciate that in some embodiments the various described systems and modules may each perform functionality that may be expressed in one or more routines, such as to perform various steps or operations in various manners (e.g., in serial or in parallel, in a synchronous or asynchronous manner, in a particular order, etc.). Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention.

Accordingly, the invention is not limited except as by corresponding claims and the elements recited therein. In addition, while certain aspects have been discussed in specific terms such as to be described as processes and/or systems and/or may be presented at times in certain claim forms, the inventors contemplate the various aspects of the invention in any available claim form, including methods, systems, computer-readable mediums on which are stored executable instructions or other contents to cause a method to be performed and/or on which are stored one or more data structures to enable performance of such a method, etc.

What is claimed is:

1. A computer-implemented method comprising:

tracking, by a configured computing system, device operations of multiple mobile devices, including storing multiple observed hardware attribute states for each mobile device at each of a plurality of times, determining whether each of the mobile devices has a subsequent device failure after the plurality of times, and separating the multiple mobile devices into a first plurality of failed mobile devices that have the subsequent device failure and a second plurality of non-failed mobile devices that do not have the subsequent device failure;

generating, by the configured computing system and based on an automated analysis of first data generated about the failed mobile devices from the tracking, one or more failure model data structures with information correlating first observed hardware attribute states of the failed mobile devices with subsequent device failure, including modeling additional first non-observable hardware attribute states of the failed mobile devices that cause the first observed hardware attribute states, and determining probabilities of occurrences of the first observed hardware attribute states and of the first non-observable hardware attribute states in light of device operations of the failed mobile devices;

generating, by the configured computing system and based on an automated analysis of second data generated about the non-failed mobile devices from the tracking, one or more non-failure model data structures with information correlating second observed hardware attribute states of the non-failed mobile devices with a lack of subsequent device failure, including modeling additional second non-observable hardware attribute states of the non-failed mobile devices that cause the second observed hardware attribute states, and determining probabilities of occurrences of the second observed hardware attribute states and of the second non-observable hardware attribute states in light of device operations of the non-failed mobile devices;

identifying, by the configured computing system, and based on the one or more failure model data structures and the one or more non-failure model data structures, an upcoming device failure of an additional mobile device, including determining that a third sequence of observed hardware attribute states of the additional mobile device over multiple times corresponds to the first non-observable hardware attribute states of the failed mobile devices; and controlling, by the configured computing system, ongoing operations for the additional mobile device to prevent the upcoming device failure of the additional mobile device, including modifying configuration settings of the additional mobile device to alter future hardware attribute states of the additional mobile device to correspond to the second non-observable hardware attribute states of the non-failed mobile devices.

2. The computer-implemented method of claim 1 wherein the identifying of the upcoming device failure of the additional mobile device includes determining that the third sequence of observed hardware attribute states of the additional mobile device matches the first non-observable hardware attribute states of the failed mobile devices, and includes predicting that the additional mobile device will have a future device failure based at least in part on the third sequence of observed hardware attribute states of the additional mobile device and on the determined probabilities of the occurrences of the first observed hardware attribute states and of the first non-observable hardware attribute states.

3. The computer-implemented method of claim 2 wherein the controlling of the ongoing operations for the additional mobile device to prevent the upcoming device failure includes modifying use of memory and communication capabilities on the additional mobile device.

4. A computer-implemented method comprising:

obtaining, by a configured computing system, a failure model representing a first plurality of mobile devices that experience a failure status after a period of time, and a non-failure model representing a second plurality of mobile devices that do not experience a failure status after the period of time, wherein the failure model is generated using first sequences of observed device attribute states of the first plurality of mobile devices over the period of time and includes information relating the observed device attribute states of the first sequences to first non-observable device attributes associated with the failure status, and wherein the non-failure model is generated using second sequences of observed device attribute states of the second plurality of mobile devices over the period of time and includes information relating the observed device attribute states of the second sequences to second non-observable device attributes associated with the non-failure status;

using, by the configured computing system, the failure model and the non-failure model to predict a future failure status of an additional mobile device, including determining that a third sequence of observed device attribute states of the additional mobile device over multiple times matches the first non-observable device attributes of the failure model, to correlate the third sequence of observed device attribute states with the future failure status; and controlling, by the configured computing system, ongoing operations for the additional mobile device to mitigate the future failure status of the additional mobile device, including modifying configuration of the additional mobile device to alter future device attribute states of the additional mobile device.

5. The computer-implemented method of claim 4 further comprising using, by the configured computing system, the failure model and the non-failure model to predict a future non-failure status of a further device, including determining that a fourth sequence of observed device attribute states of the further device matches the second non-observable device attributes of the non-failure model and does not match the first non-observable device attributes of the failure model, to correlate the fourth sequence of observed device attribute states with the future non-failure status, and wherein ongoing operations of the further device are not modified based of the predicted future non-failure status.

6. The computer-implemented method of claim 4 wherein the controlling of the ongoing operations for the additional mobile device to mitigate the future failure status of the additional mobile device includes altering the future device attribute states of the additional mobile device to match the second non-observable device attributes of the non-failure model.

7. The computer-implemented method of claim 4 wherein the controlling of the ongoing operations for the additional mobile device to mitigate the future failure status of the additional mobile device includes changing one or more configuration settings of the additional mobile device that cause altering of the future device attribute states of the additional mobile device.

8. The computer-implemented method of claim 4 wherein the controlling of the ongoing operations for the additional mobile device to mitigate the future failure status of the additional mobile device further includes changing one or more types of interactions performed by one or more other computing devices with the additional mobile device.

9. The computer-implemented method of claim 4 wherein the controlling of the ongoing operations for the additional mobile device to mitigate the future failure status of the additional mobile device includes at least one of modifying future use of memory on the additional mobile device or modifying future use of communication capabilities of the additional mobile device.

10. The computer-implemented method of claim 4 wherein the obtaining of the failure model and the non-failure model includes tracking the first sequences of observed device attribute states and the second sequences of observed device attribute states, and includes generating the failure model and the non-failure model based on the tracking.

11. The computer-implemented method of claim 10 wherein the first and second sequences of observed device attribute states includes, at each of multiple times within the period of time and for each of at least some of the first and second plurality of mobile devices, attribute information about multiple of attribute states that include packet loss status, device restart status, application load time status, application crash status, connection speed status, dropped call status, screen capacitance status and accelerometer data status, and wherein the generating of the failure model and the non-failure model based on the tracking includes using the attribute information.

12. The computer-implemented method of claim 10 wherein the first and second sequences of observed device attribute states includes, at each of multiple times within the period of time and for each of at least some of the first and second plurality of mobile devices, attribute information for packet loss status, device restart status, application load time status, application crash status, connection speed status, dropped call status, screen capacitance status and accelerometer data status, and wherein the generating of the failure model and the non-failure model based on the tracking includes using the attribute information.

13. The computer-implemented method of claim 10 wherein the first and second sequences of observed device attribute states includes, at each of multiple times within the period of time and for each of at least some of the first and second plurality of mobile devices, attribute information for multiple of attribute states that include use of different types of communication capabilities, versions of executing software, an operating system in use, and characteristics of user interactions with one or more input devices, and wherein the generating of the failure model and the non-failure model based on the tracking includes using the attribute information.

14. The computer-implemented method of claim 10 wherein the first and second non-observable device attributes include multiple of a cracked screen, a data port failure, a charging port failure and an antenna failure, and wherein the generating of the failure model and the non-failure model based on the tracking includes modeling effects of the multiple of the first and second non-observable device attributes.

15. The computer-implemented method of claim 4 wherein the obtained failure model is segmented into multiple failure sub-models that are associated with distinct groups of device characteristics corresponding to subsets of the first plurality of mobile devices, and wherein the using of the failure model and the non-failure model to predict the future failure status of the additional mobile device includes selecting, by the configured computing system, one of the multiple failure sub-models to use based at least in part on the associated device characteristics of the selected one failure sub-model matching device characteristics of the additional mobile device, and matching the observed device attribute states of the third sequence to a subset of the observed device attribute states of the first sequences that are part of the selected one failure sub-model.

16. The computer-implemented method of claim 4 wherein the predicted future failure status of the additional mobile device includes a security failure for the additional mobile device, and wherein the controlling of the ongoing operations includes initiating use of additional security measures on the additional mobile device.

17. The computer-implemented method of claim 4 wherein the controlling of the ongoing operations includes initiating use of a further mobile device to replace the additional mobile device.

18. The computer-implemented method of claim 4 wherein the configured computing system is a server system separated from the additional mobile device by one or more computer networks, and wherein the using of the failure model and the non-failure model to predict a future failure status of an additional mobile device is performed for each of a plurality of additional mobile devices.

19. The computer-implemented method of claim 4 wherein the configured computing system is the additional mobile device, and wherein the using of the failure model and the non-failure model to predict the future failure status includes executing an automated operations manager system on the additional mobile device to perform the controlling of the ongoing operations for the additional mobile device.

20. The computer-implemented method of claim 4 further comprising notifying, by at least one of the configured computing system or the additional mobile device, a user of one or more configuration modifications for the additional mobile device, and wherein the modifying of the configuration of the additional mobile device is based at least in part on a response of the user to the notifying.

21. The computer-implemented method of claim 4 wherein the modifying of the configuration of the additional mobile device includes selecting one or more modification actions to perform based on at least one of information specific to the additional mobile device to customize the selecting to the additional mobile device or information specific to a user of the additional mobile device to customize the selecting to the user.

22. The computer-implemented method of claim 4 wherein the using of the failure model and the non-failure model to predict the future failure status of the additional mobile device further includes determining that the third sequence of observed device attribute states has a fit to the first non-observable device attributes of the failure model that exceeds a defined threshold and does not have a fit to the second non-observable device attributes of the non-failure model that exceeds the defined threshold.

23. The computer-implemented method of claim 4 wherein the additional mobile device is at least one of a smartphone, a portable gaming device, a tablet computer or a laptop computer, wherein the failure model further includes information about determined probabilities of occurrences of the observed device attribute states of the first sequences and of the first non-observable device attributes, and wherein the using of the failure model and the non-failure model to predict the future failure status of the additional mobile device includes using the determined probabilities for the third sequence of observed device attribute states to determine that a likelihood of the additional mobile device failing by a specified time exceeds a defined threshold.

24. A non-transitory computer-readable medium having stored contents that cause one or more computing systems to perform automated operations including at least:
  obtaining, by the one or more computing systems, a failure model generated using first sequences over time of observed device attribute states of a first plurality of computing devices each having a failure status after the first sequences, and a non-failure model generated using second sequences over time of observed device attribute states of a second plurality of computing devices each having a non-failure status after the second sequences, wherein the failure model includes information relating the observed device attribute states of the first sequences to first non-observable device attributes associated with the failure status, and wherein the non-failure model includes information relating the observed device attribute states of the second sequences to second non-observable device attributes associated with the non-failure status;
  using, by the one or more computing systems, the failure model and the non-failure model to predict a future failure status of an additional computing device, including determining that a third sequence of observed device attribute states of the additional computing device over multiple times matches the first non-observable device attributes of the failure model, to correlate the third sequence of observed device attribute states with the future failure status; and
  controlling, by the one or more computing systems, ongoing operations to mitigate the future failure status of the additional computing device.

25. The non-transitory computer-readable medium of claim 24 wherein the additional computing device is a mobile device, wherein the controlling of the ongoing operations includes initiating use of a further computing device to replace the additional computing device, wherein the using of the failure model and the non-failure model to predict the future failure status of the additional computing device further includes determining that the third sequence of observed device attribute states has a fit to the first non-observable device attributes of the failure model that exceeds a defined threshold and does not have a fit to the second non-observable device attributes of the non-failure model that exceeds the defined threshold, and wherein the stored contents include software instructions that, when executed, program the one or more computing systems to perform the automated operations.

26. The non-transitory computer-readable medium of claim 24 wherein the stored contents further cause the one or more computing systems to perform additional automated operations including at least:
  using, by the one or more computing systems, a third model and a fourth model to predict a future health impairment diagnosis of an indicated patient, wherein the third model includes information relating, for first health attribute states observed over time for a first group of target patients that each has a subsequent health impairment diagnosis, the first health attribute states to first non-observable health attributes associated with the health impairment diagnosis, wherein the fourth model includes information relating, for second health attribute states observed over time for a second group of target patients that each has a subsequent health diagnosis of non-impairment, the second health attribute states to second non-observable health attributes associated with the health diagnosis of non-impairment, and wherein the using of the third and fourth models includes determining that additional health attribute states observed for the indicated patient over a plurality of times matches the first non-observable health attributes of the third model, to correlate the additional health attribute states with the future health impairment diagnosis; and
  providing, by the one or more computing systems, information about the predicted future health impairment diagnosis, to cause further actions to be taken for the indicated patient to address the future health impairment diagnosis.

27. The non-transitory computer-readable medium of claim 24 wherein the stored contents further cause the one or more computing systems to perform additional automated operations including at least:
  using, by the one or more computing systems, a third model and a fourth model to predict that an indicated person in a physical store will participate in a future activity of an indicated type, wherein the third model includes information relating, for first activity attribute states observed over time for a first group of target people that each participates in a subsequent activity of the indicated type, the first activity attribute states to first non-observable activity attributes associated with participating in the activity of the indicated type, wherein the fourth model includes information relating, for second activity attribute states observed over time for a second group of control people that each does not participate in a subsequent activity of the indicated type, the second activity attribute states to second non-observable activity attributes associated with not participating in the activity of the indicated type, and wherein the using of the third and fourth models includes determining that additional activity attribute states observed for the indicated person over a plurality of times matches the first non-observable activity attributes of the third model, to correlate the additional activity attribute states with participating in the future activity of the indicated type; and
  providing, by the one or more computing systems, information about the predicted participation in the future activity of the indicated type, to cause further actions to be taken for the indicated person that correspond to the future activity of the indicated type.

28. A system comprising:
one or more hardware processors of one or more computing systems; and
one or more memories with stored instructions that, when executed, cause the system to perform automated operations including at least:
obtaining a failure model generated using first sequences over time of observed device attribute states of a first plurality of computing devices each having a failure status after the first sequences, and a non-failure model generated using second sequences over time of observed device attribute states of a second plurality of computing devices each having a non-failure status after the second sequences, wherein the failure model includes information relating the observed device attribute states of the first sequences to first non-observable device attributes associated with the failure status, and wherein the non-failure model includes information relating the observed device attribute states of the second sequences to second non-observable device attributes associated with the non-failure status;
using the failure model and the non-failure model to predict a future failure status of an additional computing device, including determining that a third sequence of observed device attribute states of the additional computing device over multiple times matches the first non-observable device attributes of the failure model, to correlate the third sequence of observed device attribute states with the future failure status; and
controlling ongoing operations of the additional computing device to mitigate the future failure status of the additional computing device.

29. The system of claim 28 wherein the additional computing device is a mobile device, wherein the predicted future failure status of the additional computing device includes a security failure for the additional computing device, wherein the controlling of the ongoing operations includes initiating use of additional security measures on the additional computing device, and wherein the stored instructions include software instructions that, when executed, program the one or more computing systems to perform the automated operations.

30. The system of claim 28 wherein the using of the failure model and the non-failure model to predict the future failure status of the additional computing device further includes determining that the third sequence of observed device attribute states has a fit to the first non-observable device attributes of the failure model that exceeds a defined threshold and does not have a fit to the second non-observable device attributes of the non-failure model that exceeds the defined threshold.

* * * * *